(12) United States Patent
Yoneyama

(10) Patent No.: US 6,317,275 B1
(45) Date of Patent: Nov. 13, 2001

(54) INTERNAL FOCUSING TELEPHOTO LENS

(75) Inventor: Shuji Yoneyama, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/540,980

(22) Filed: Mar. 31, 2000

(30) Foreign Application Priority Data

Apr. 2, 1999 (JP) .................................................. 11-096828

(51) Int. Cl.$^7$ ............................... G02B 13/02; G02B 9/14
(52) U.S. Cl. ........................... 359/748; 359/745; 359/785
(58) Field of Search .................................... 359/745, 748, 359/785, 786, 788

(56) References Cited

U.S. PATENT DOCUMENTS

| | | | | |
|---|---|---|---|---|
| 4,293,197 | * | 10/1981 | Kobayashi et al. | 359/745 |
| 4,545,654 | * | 10/1985 | Sato | 359/745 |
| 4,576,443 | | 3/1986 | Itoh | 359/690 |
| 4,610,514 | * | 9/1986 | Nakamura | 359/746 |
| 4,786,152 | * | 11/1988 | Arimoto | 359/745 |
| 4,852,984 | | 8/1989 | Takahashi et al. | 359/748 |
| 5,325,234 | * | 6/1994 | Yoneyama | 359/684 |

FOREIGN PATENT DOCUMENTS 5-157964   6/1993   (JP) ............................... G02B/13/02
9-159911   6/1997   (JP) ............................... G02B/13/02

* cited by examiner

*Primary Examiner*—Gerogia Epps
*Assistant Examiner*—David N. Spector
(74) *Attorney, Agent, or Firm*—Greenblum & Bernstein, P.L.C.

(57) ABSTRACT

The internal focusing telephoto lens includes a first lens group I of positive refractive power, a second lens group II of negative refractive power and a third lens group III of positive refractive power, arranged in order from an object side. The second lens group II is movable along an optical axis for focusing. The first lens group I includes a first positive lens I-1, a second positive meniscus lens I-2 whose object side surface is convex, a third positive meniscus lens I-3 whose object side surface is convex and a fourth negative meniscus lens I-4 whose object side surface is convex, in order from the object side. At least two of the first positive lens I-1, the second positive meniscus lens I-2 and the third positive meniscus lens I-3 in the first lens group I satisfy the following conditions (1) and (2);

Figure 1:
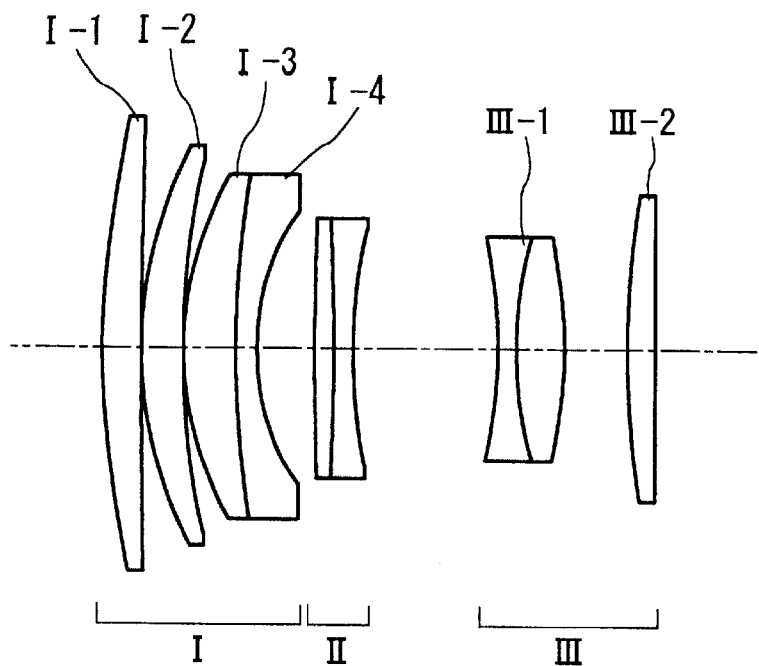

$$1.55 < n_I < 1.75 \quad (1)$$

$$61 < \nu_I \quad (2)$$

where $n_I$ is refractive index and $\nu_I$ is Abbe number of the lenses in the first lens group I.

10 Claims, 21 Drawing Sheets

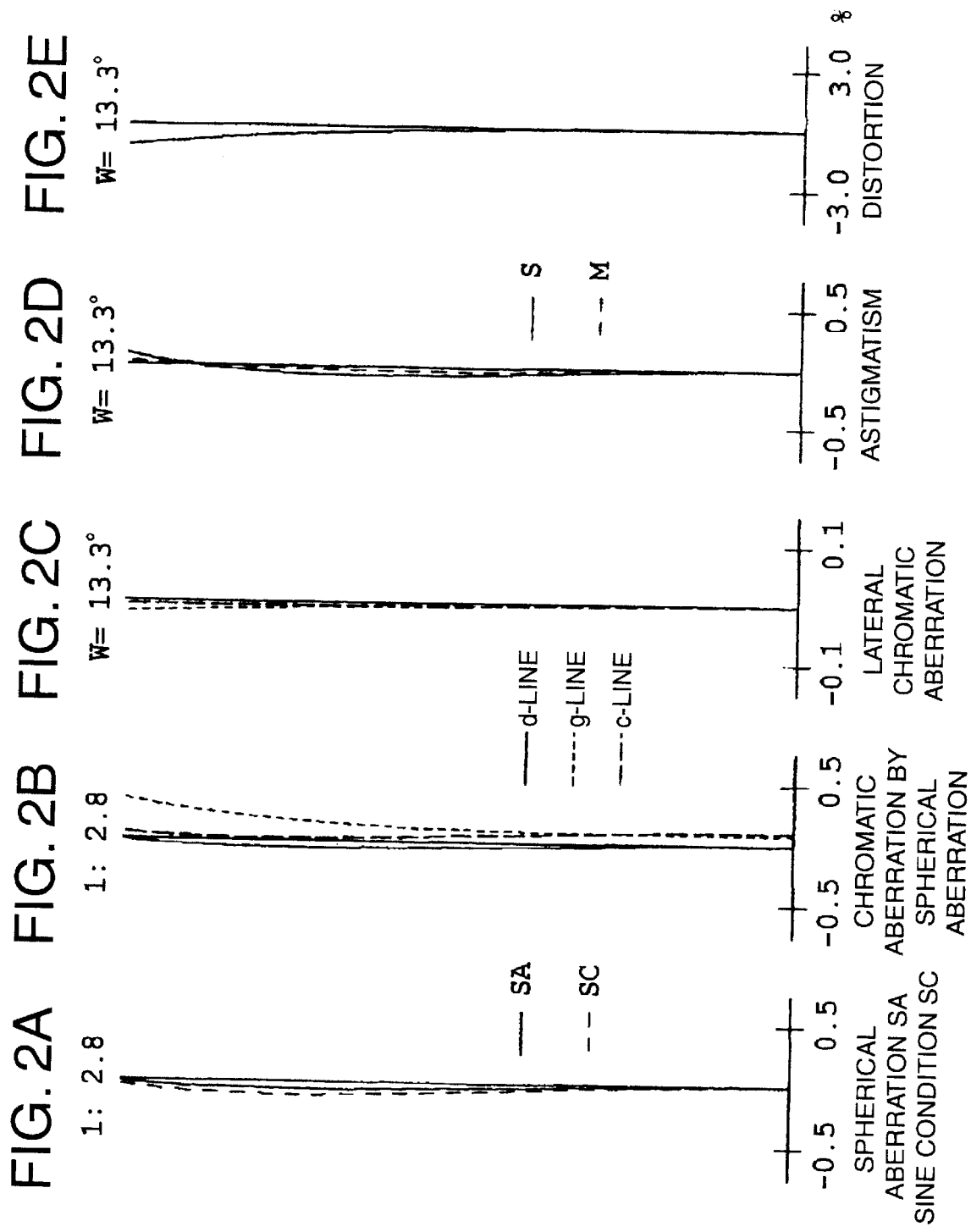

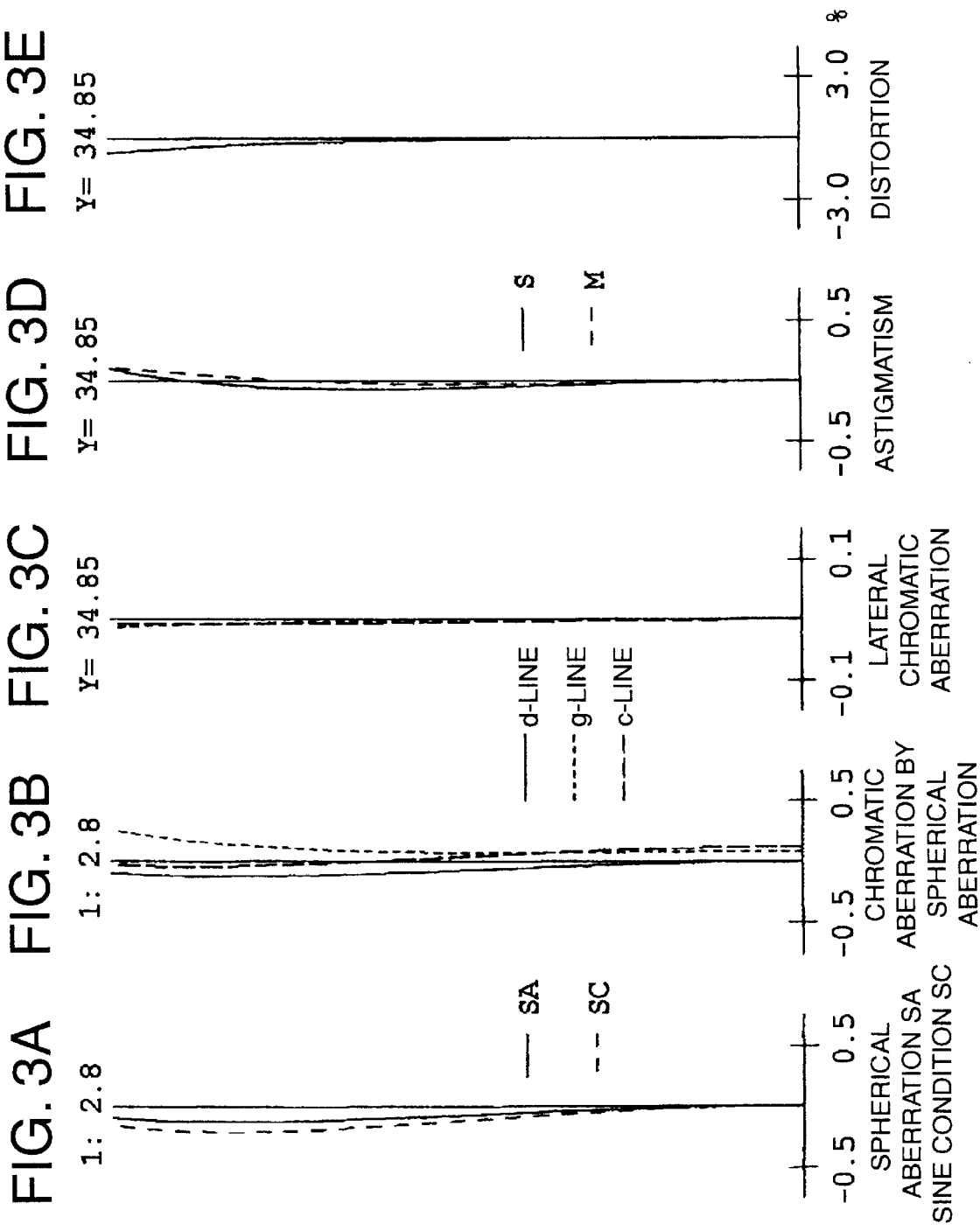

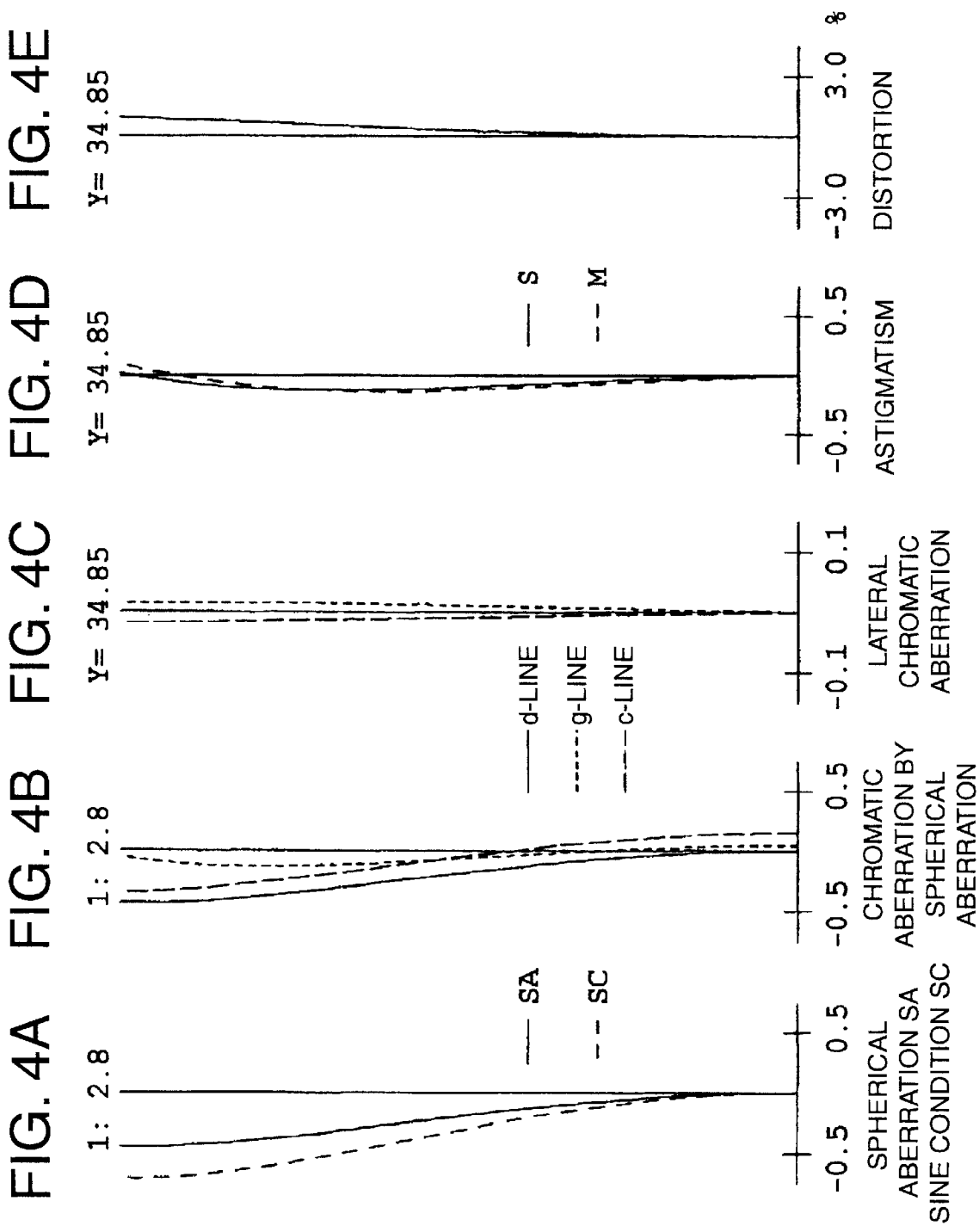

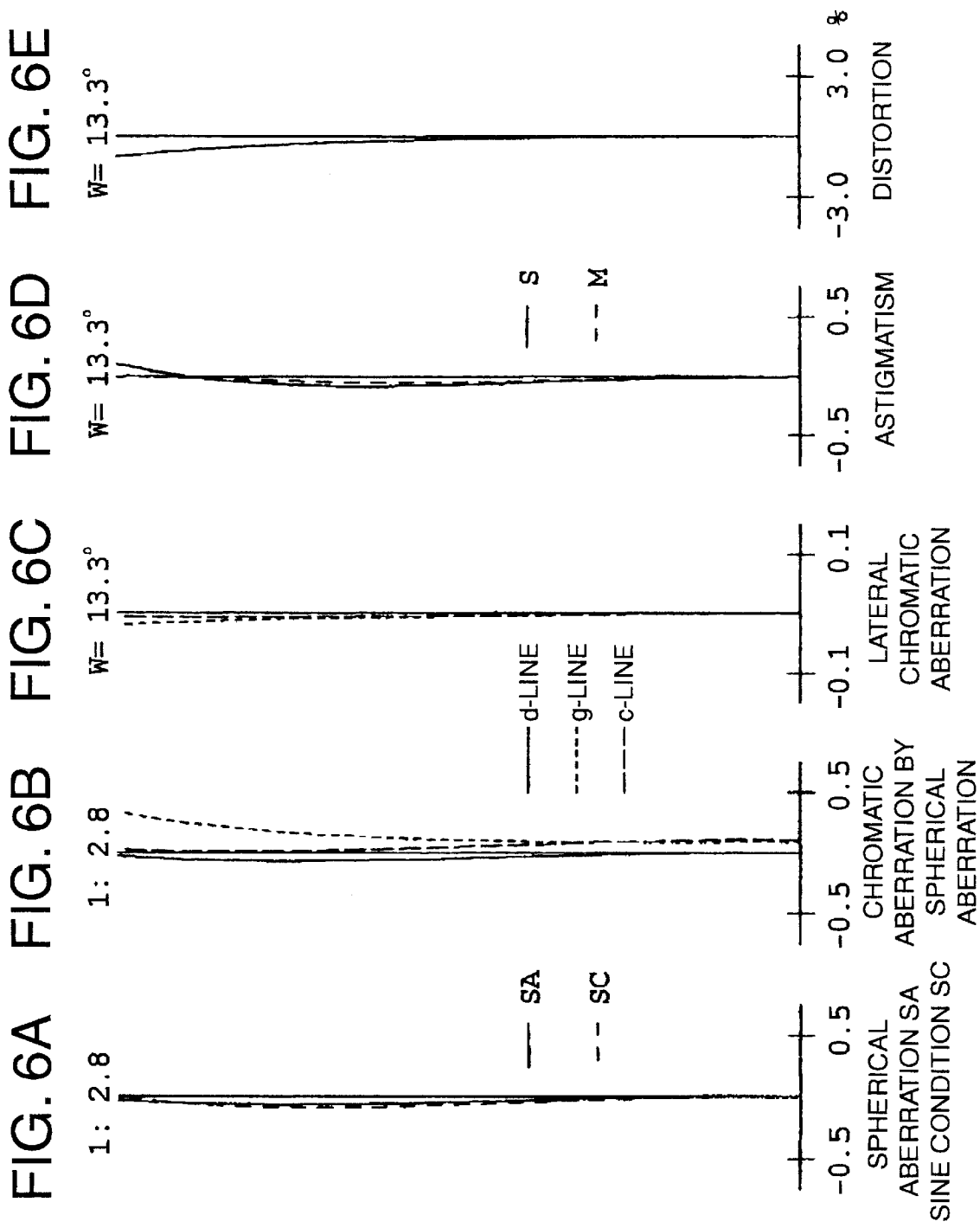

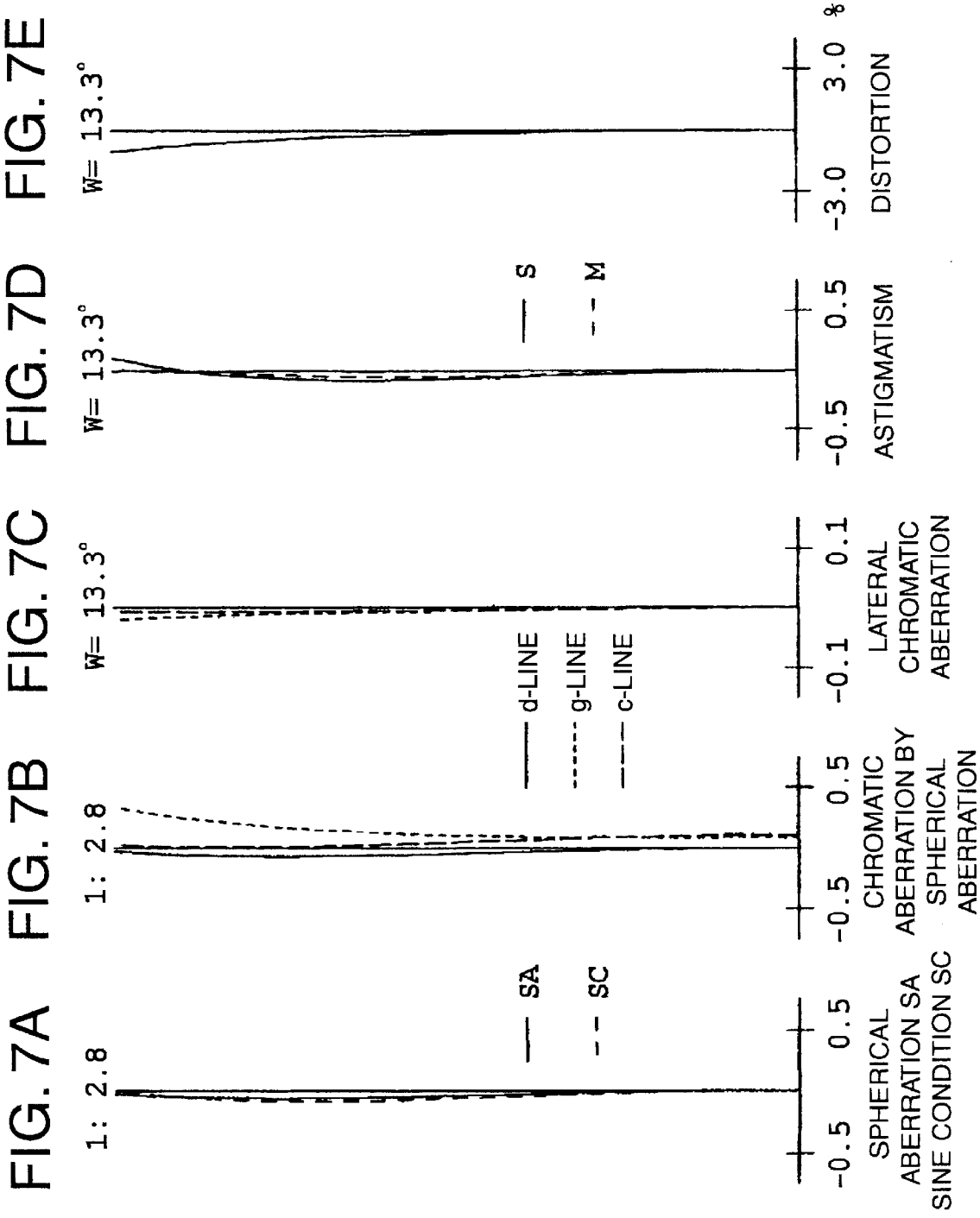

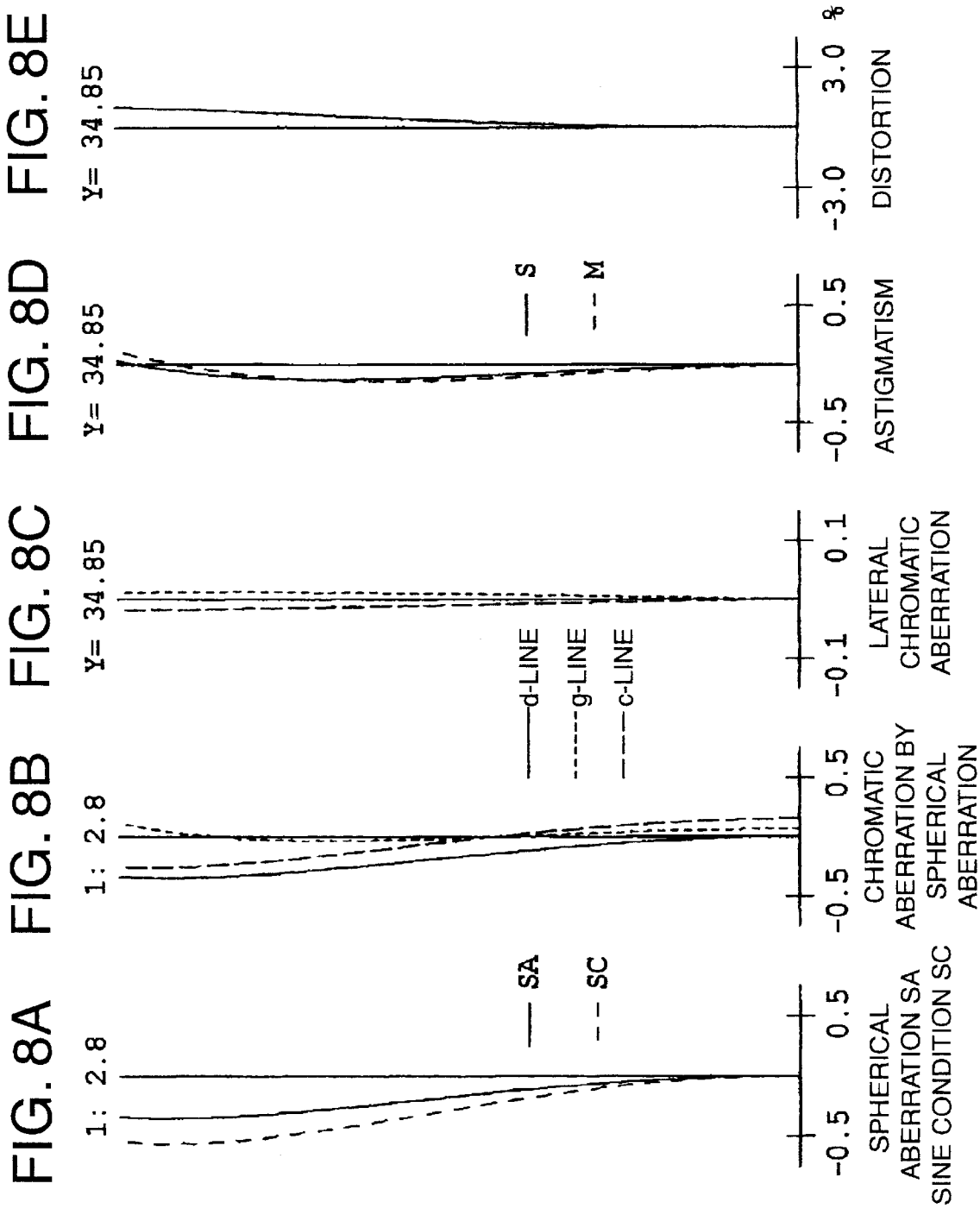

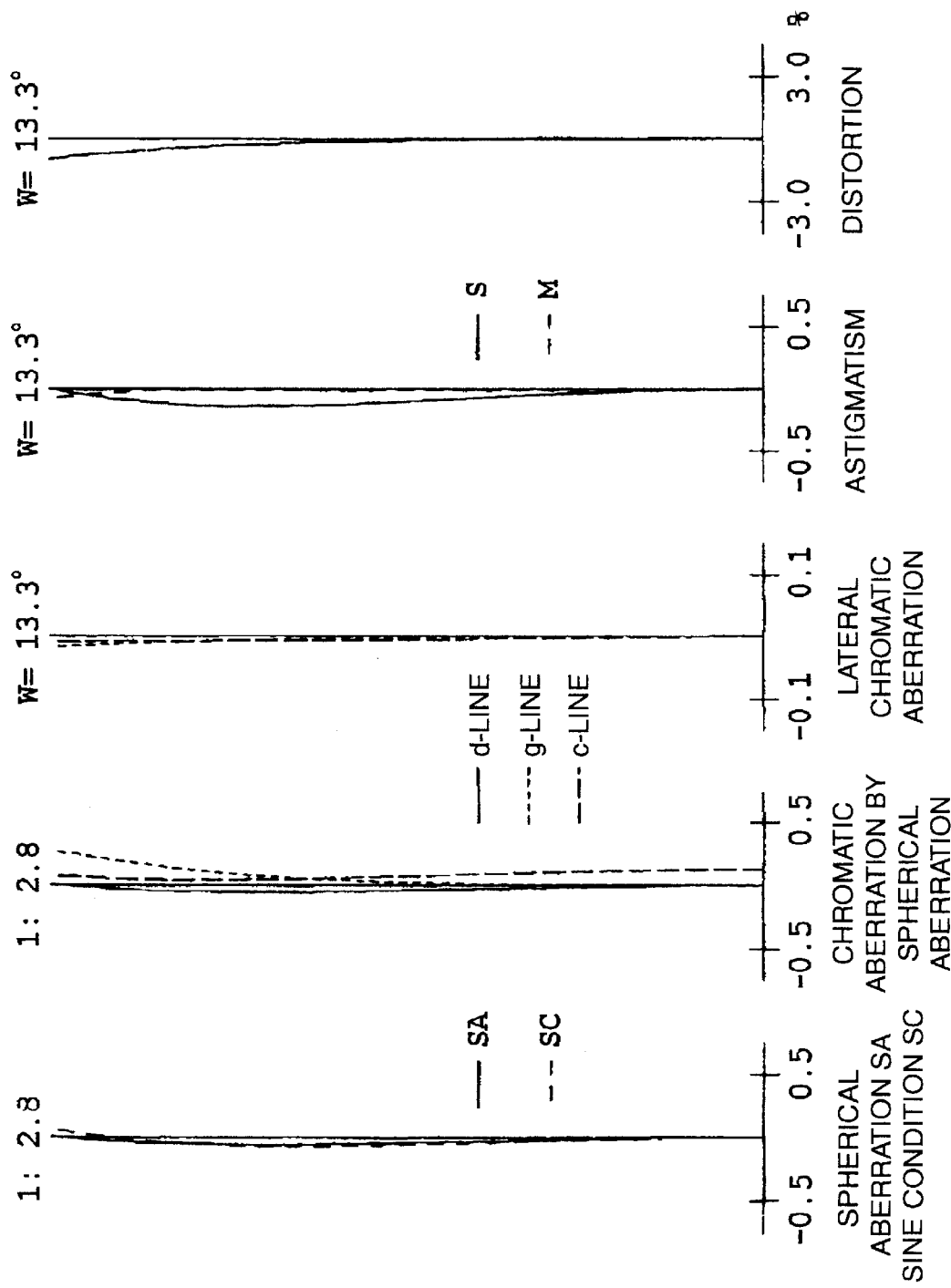

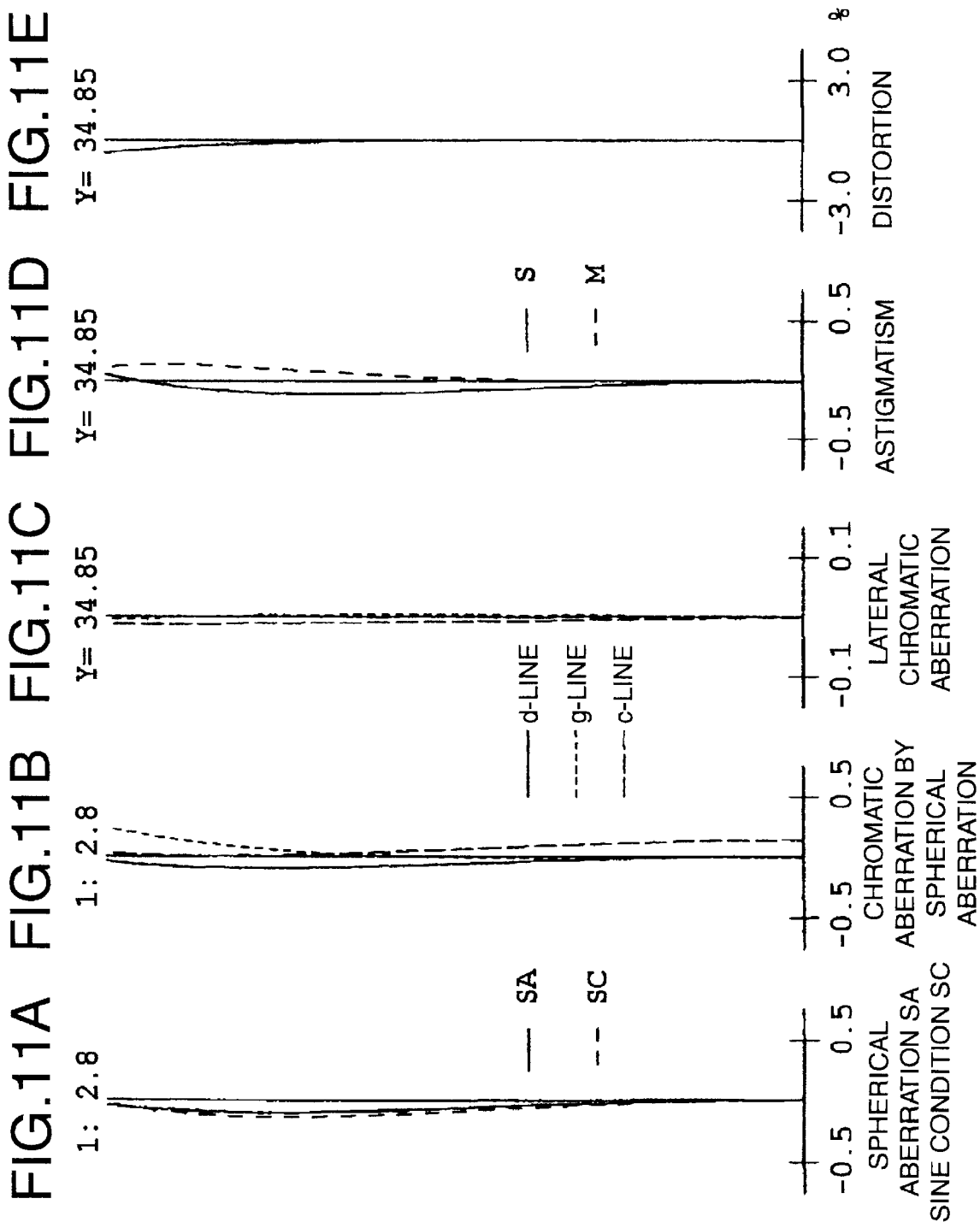

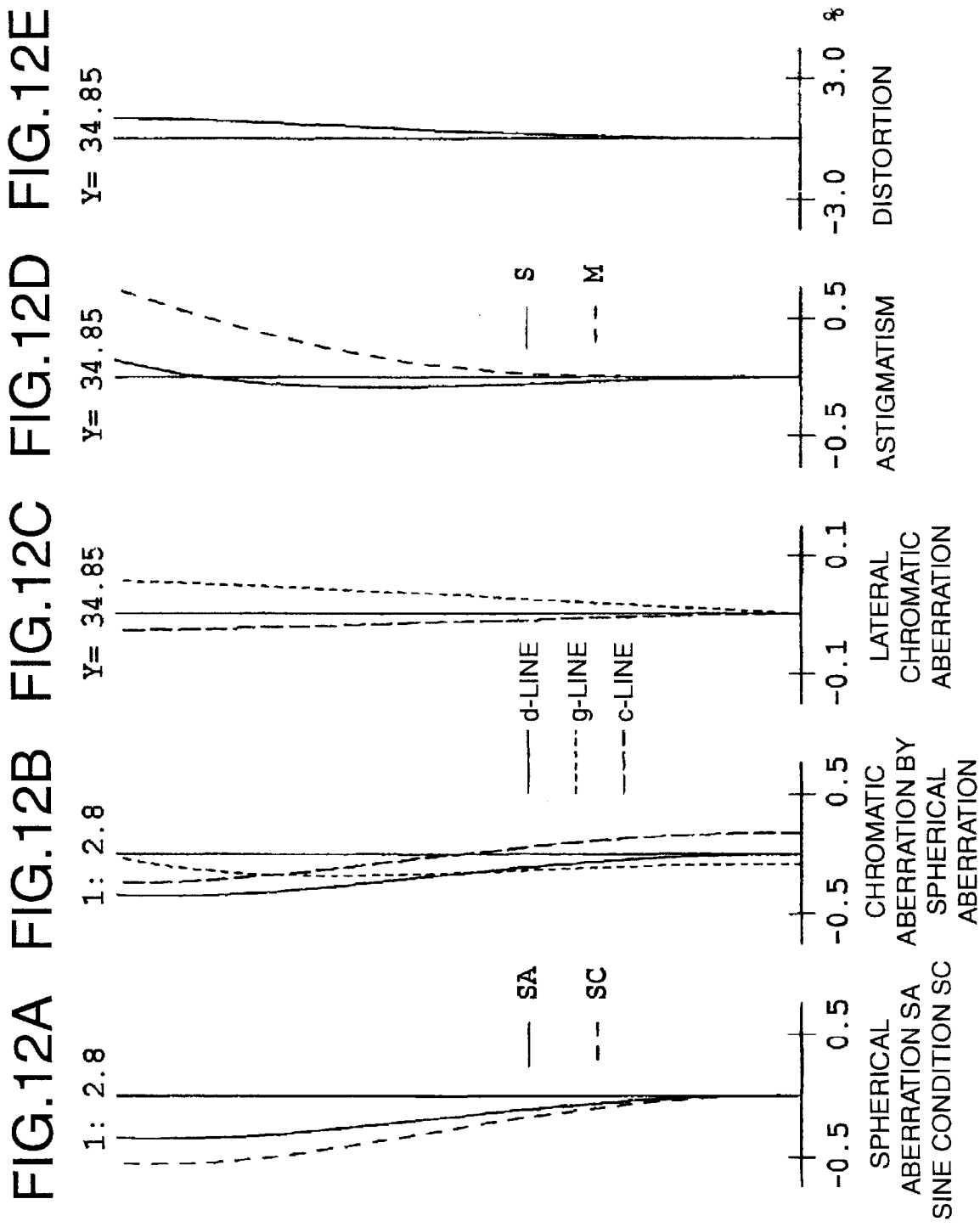

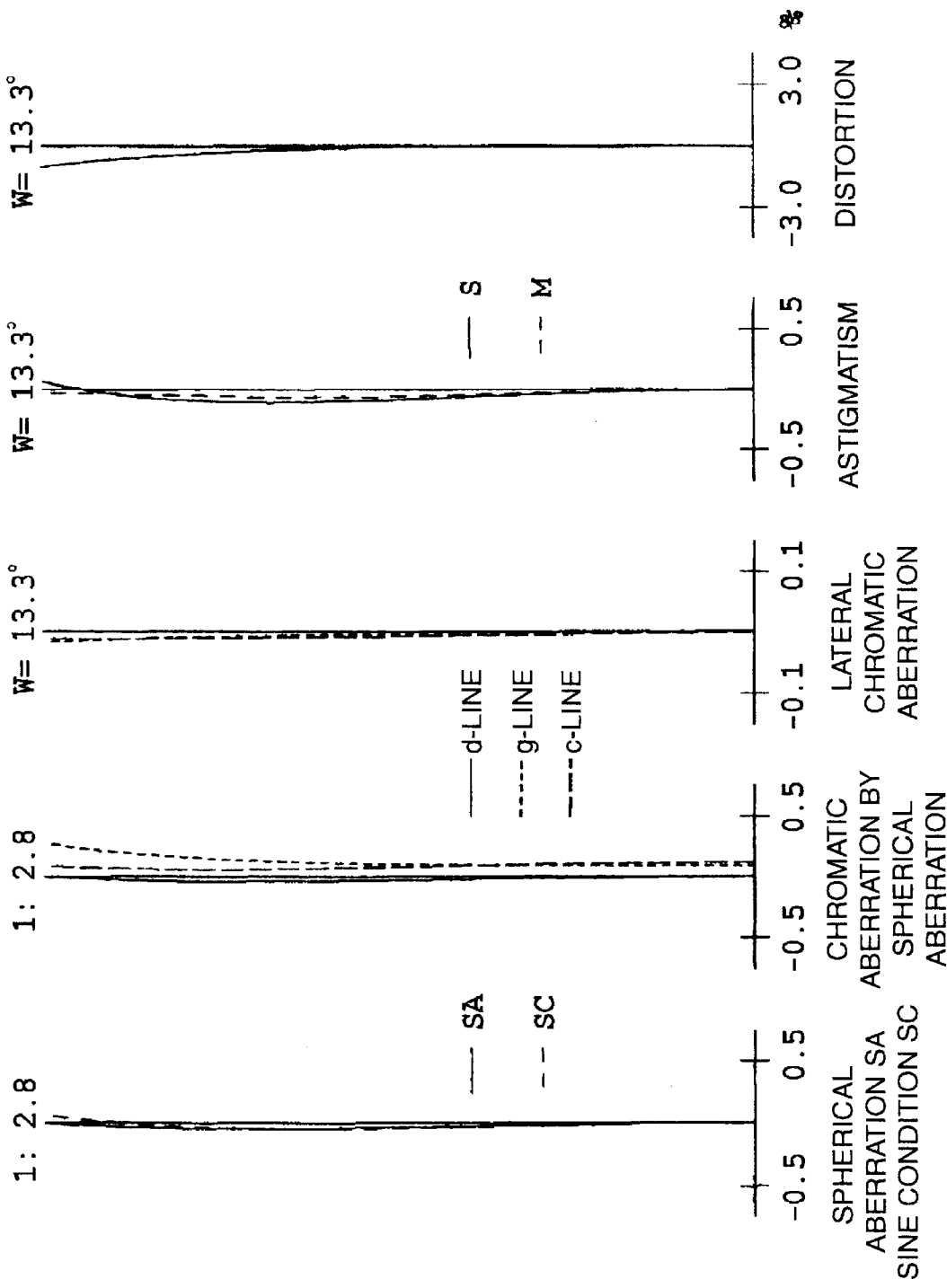

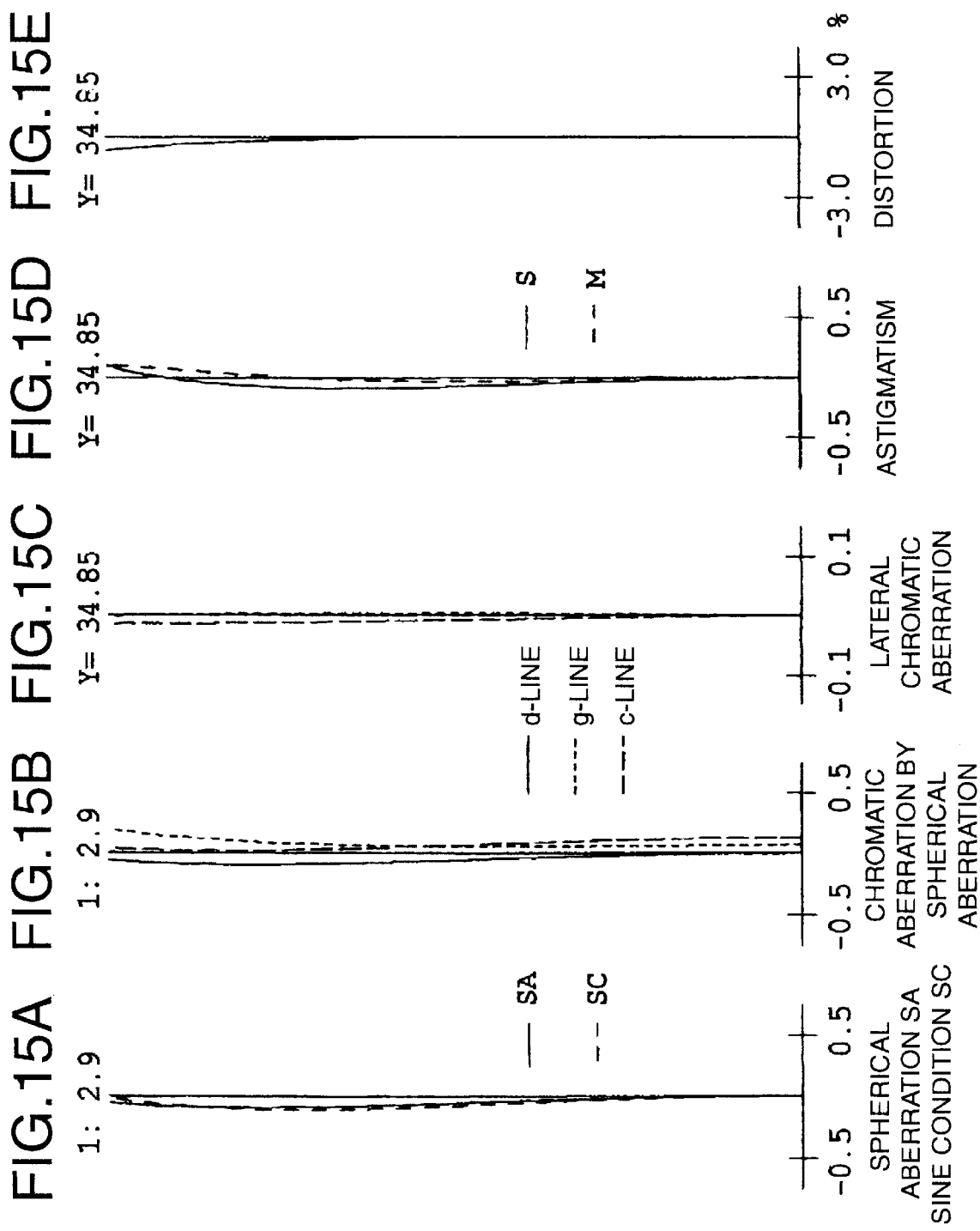

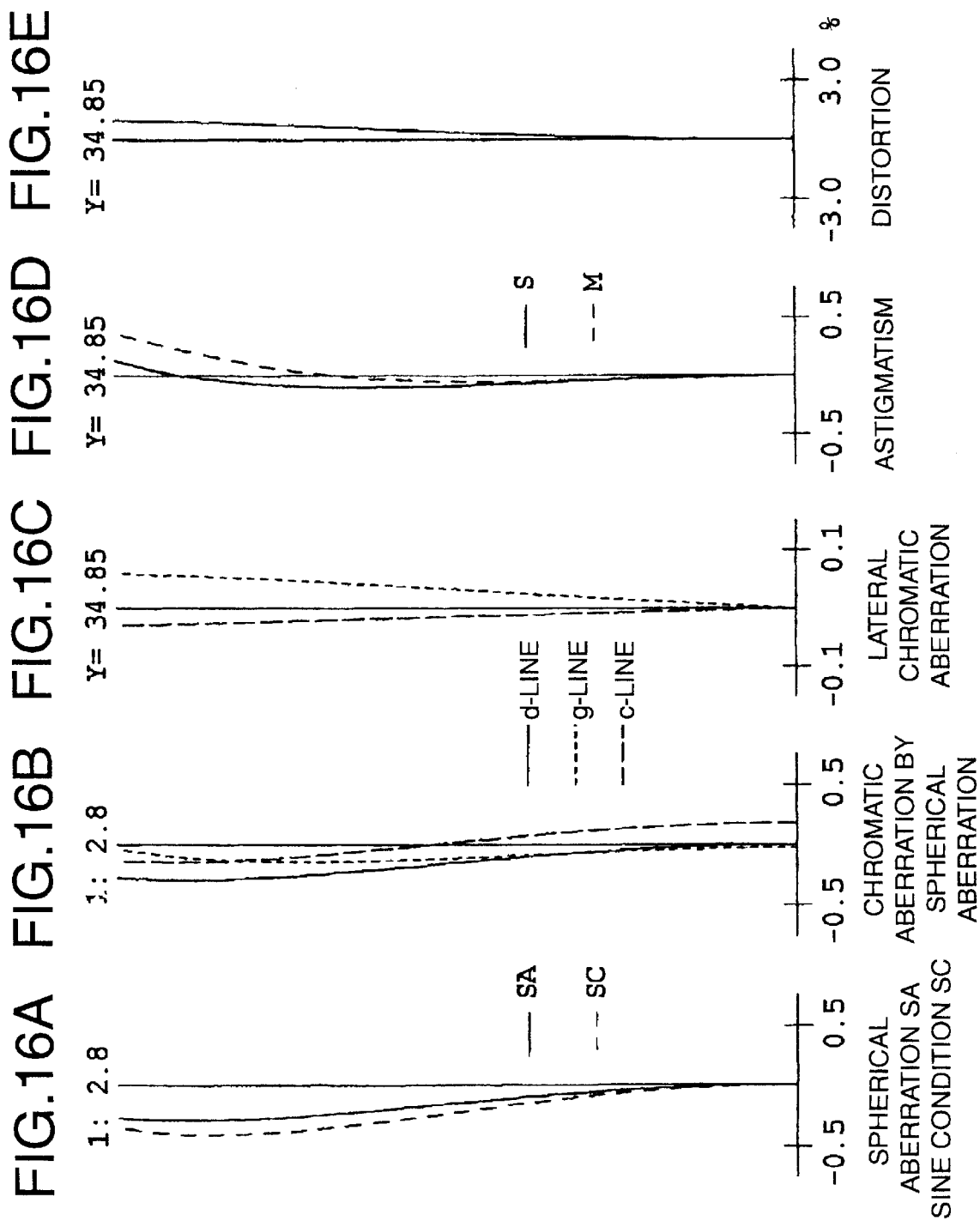

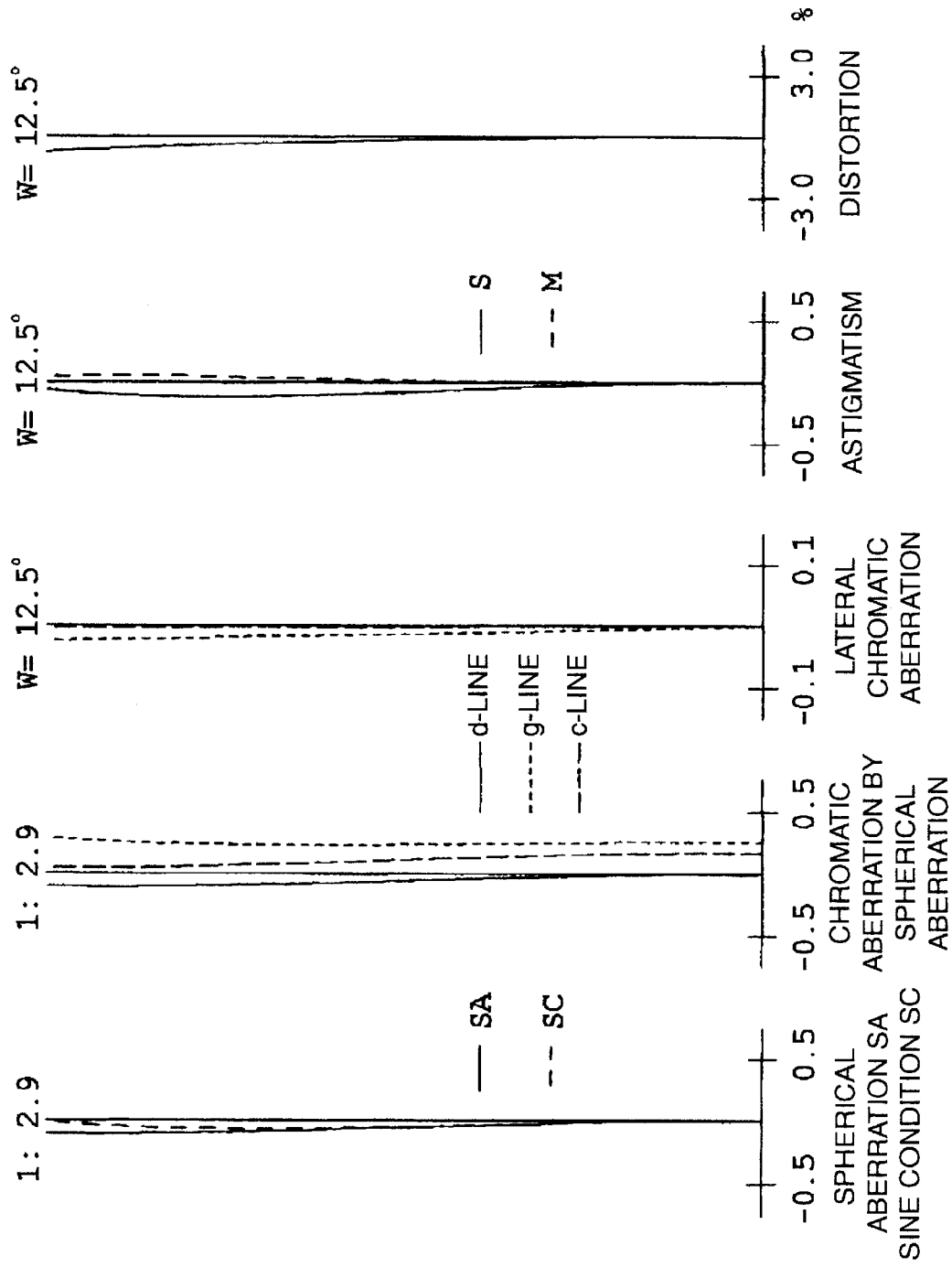

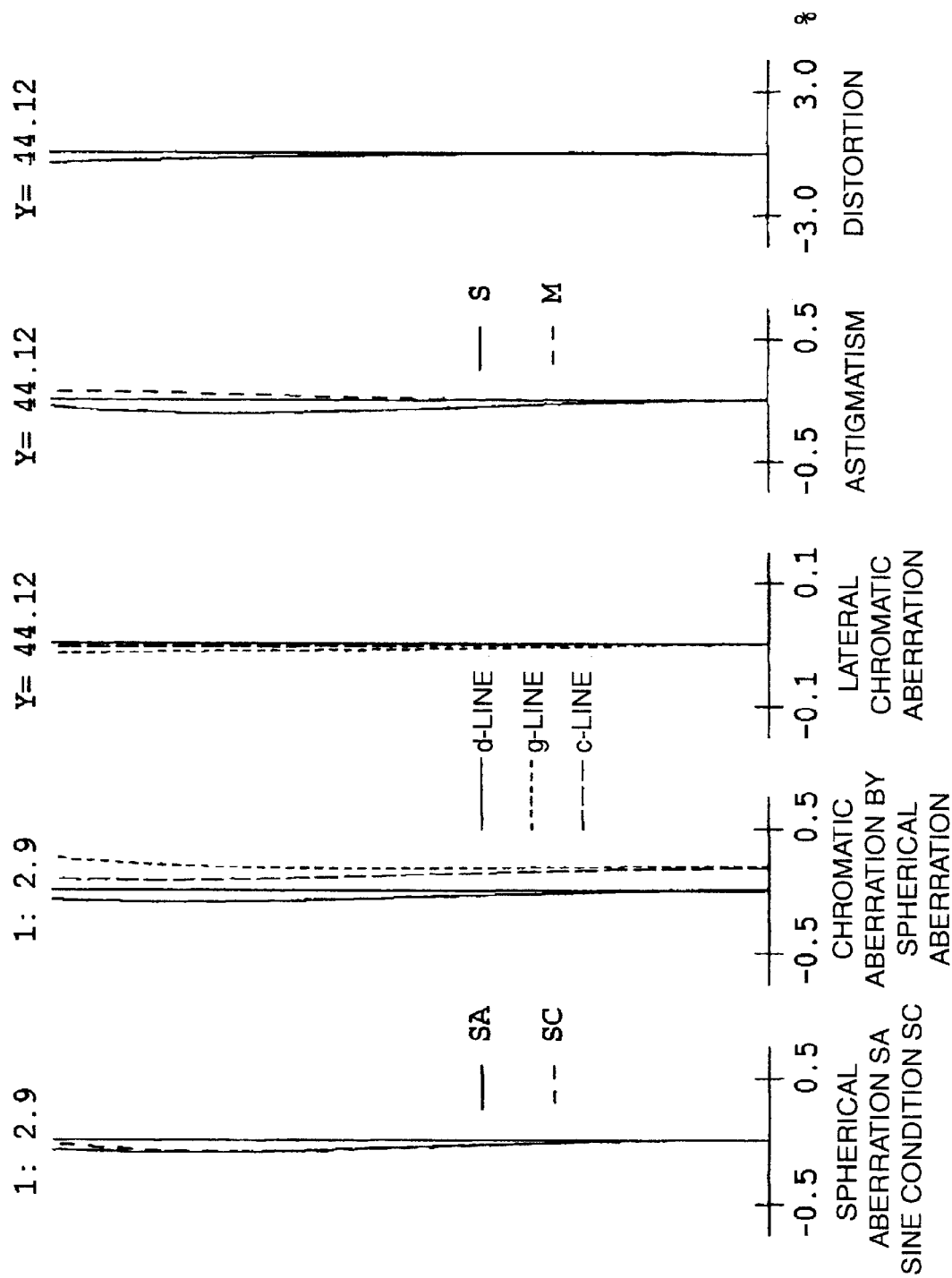

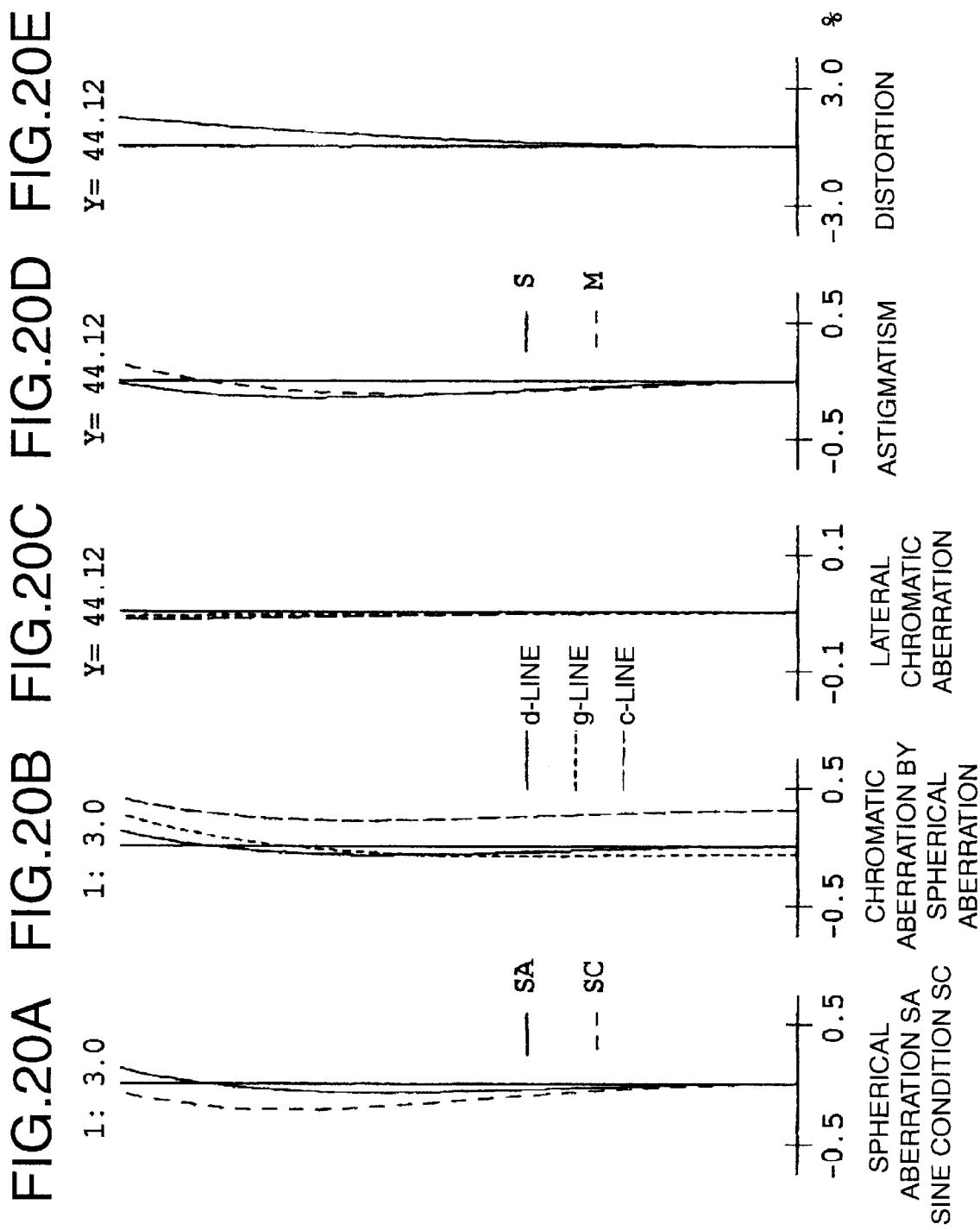

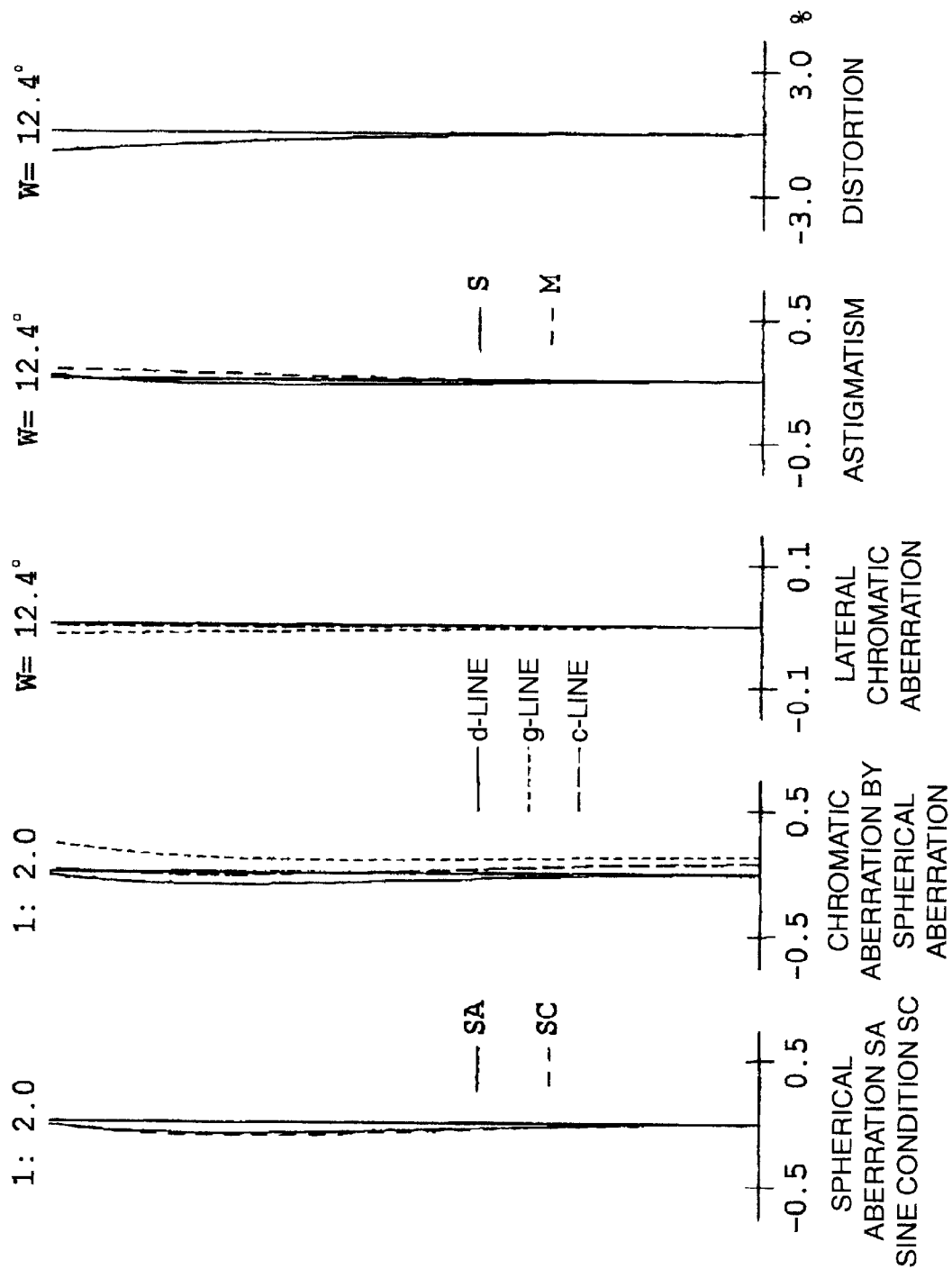

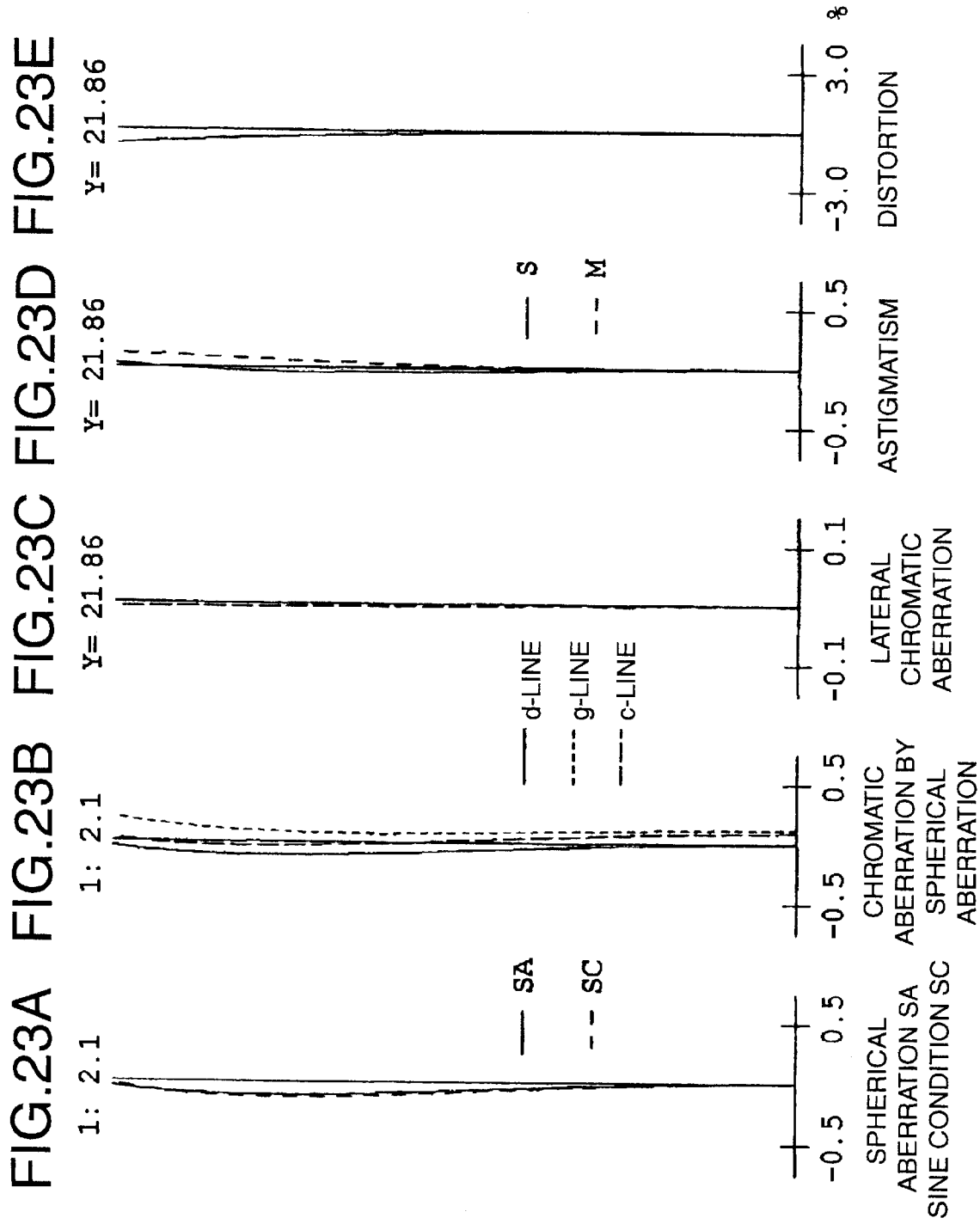

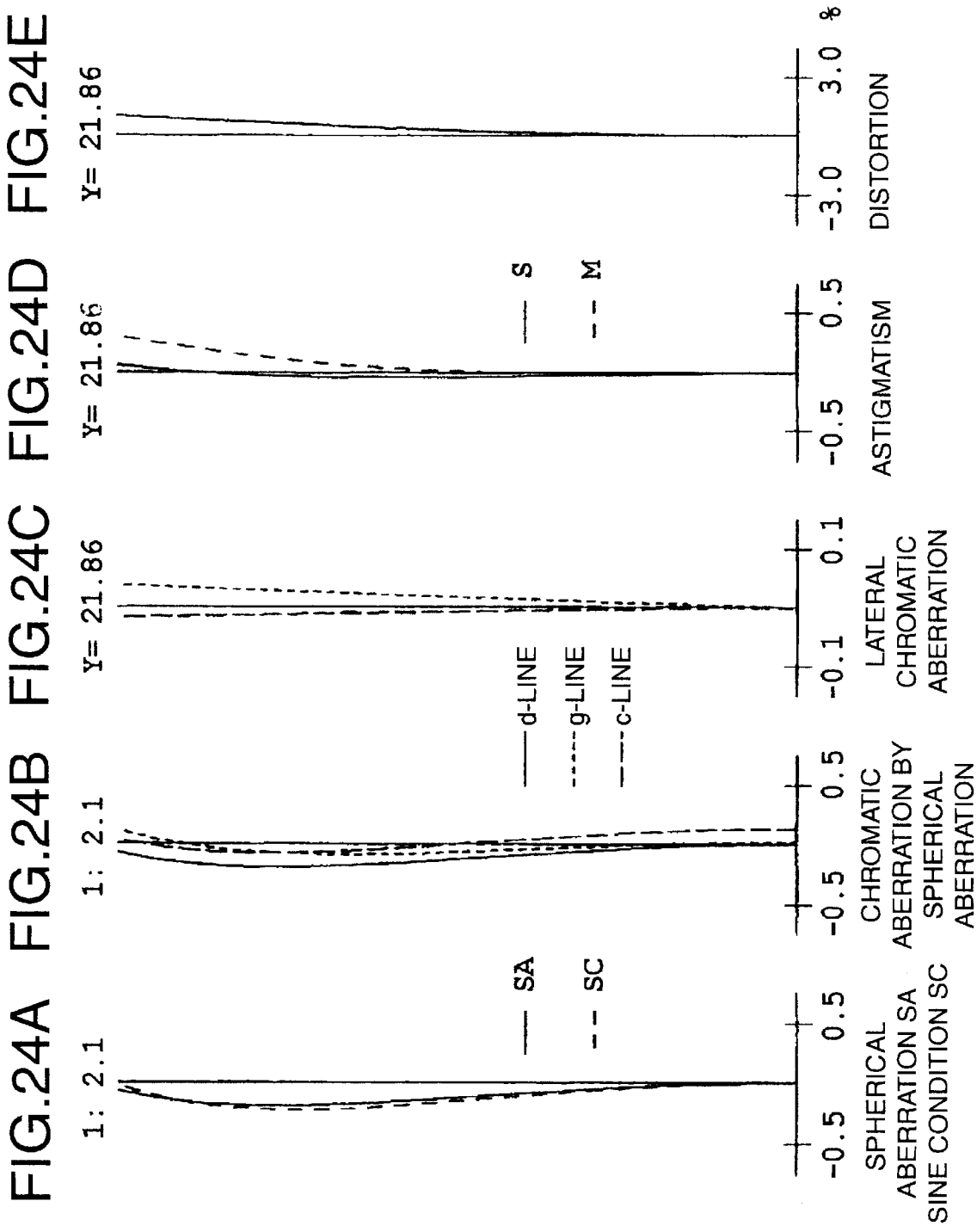

INTERNAL FOCUSING TELEPHOTO LENS

BACKGROUND OF THE INVENTION

The present invention relates to an internal focusing telephoto lens that is suitable for a photographing camera, a video camera or the like. More particularly, the present invention relates to the telephoto lens whose view angle is about 25 degrees and F-number is about 2 through 2.8.

In general, a fast telephoto lens tends to be long in the overall length and heavy in weight. Therefore, such a fast telephoto lens often employs an internal focusing mechanism. The internal focusing mechanism reduces barycentric movement during the focusing, allows high speed focusing due to low-load to the focusing mechanism and reduces variation of aberration though the use of a floating effect, as compared with a telephoto lens that employs a whole-elements focusing mechanism.

U.S. Pat. No. 4,852,984, Japanese patent provisional publications Nos. Hei 5-157964 and Hei 9-159911 disclose the internal focusing telephoto lenses.

The publication Hei 1-154112 discloses the telephoto lenses whose F-numbers are 1.2 through 1.4 and view angles are about 30 degrees. Each of the telephoto lenses of the publication includes a great number of lenses, while chromatic aberration, particularly chromatic aberration in spherical aberration and lateral chromatic aberration, and astigmatism are not sufficiently corrected.

The publication Hei 5-157964 discloses the telephoto lenses whose F-numbers are 1.8 and view angles are about 29 degrees. Since each of the telephoto lenses of the publication varies spherical aberration, astigmatism and distortion during the focusing, it cannot insure good optical performance over the full focusing range.

The publication Hei 9-159911 discloses the telephoto lenses whose F-numbers are 2.0 and view angles are about 19 degrees. The telephoto lenses of the first through third embodiments of the publication include a great number of lenses. The lenses of the fourth and fifth embodiments are narrow in the view angle and insufficient in the correction of astigmatism.

Further, when the telephoto lenses disclosed in the publications are scaled up for applying to a large format camera using Brownie film, chromatic aberration also scales up, which makes correction of chromatic aberration be deficient.

SUMMARY OF THE INVENTION

It is therefore an object of the present invention to provide an internal focusing telephoto lens, which is capable of reducing the variations of chromatic aberration, spherical aberration, astigmatism or the like over the full focusing range where f-number is 2.0 through 2.8 and view angle is about 25 degrees while maintaining a relatively small lens number.

For the above object, according to the present invention, there is provided an improved internal focusing telephoto lens, which includes a first lens group I of positive refractive power, a second lens group II of negative refractive power and a third lens group III of positive refractive power, arranged in order from an object side. The first lens group I includes a first positive lens I-1, a second positive meniscus lens I-2 whose object side surface is convex, a third positive meniscus lens I-3 whose object side surface is convex and a fourth negative meniscus lens I-4 whose object side surface is convex, in order from the object side. The second lens group II is movable along an optical axis for focusing. The third lens group III includes a first meniscus lens III-1 whose object side surface is concave and a second positive lens III-2. Further, the telephoto lens of the present invention features that at least two positive lenses in the first lens group I satisfy the following conditions (1) and (2);

$$1.55 < n_I < 1.75 \quad (1)$$

$$61 < v_I \quad (2)$$

where $n_I$ is refractive index at d-line (588 nm) and $v_I$ is Abbe number of the lenses in the first lens group I.

The first lens III-1 in the third lens group III may consist of a biconcave lens and a biconvex lens that are cemented to each other.

Further, the following conditions (3) and/or (4) may be satisfied;

$$-10 < f/r_{III\text{-}1\text{-}1} < -1.5 \quad (3)$$

$$0.003 < d_{III\text{-}1\text{-}III\text{-}2}/f < 0.25 \quad (4)$$

where f is focal length of the entire lens system in an infinite focusing condition, $r_{III\text{-}1\text{-}1}$ is a radius of curvature of the object side surface of the first lens III-1 in the third lens group III and $d_{III\text{-}1\text{-}III\text{-}2}$ is a distance between the first lens III-1 and the second lens III-2 in the third lens group III.

DESCRIPTION OF THE ACCOMPANYING DRAWINGS

Figure 5:
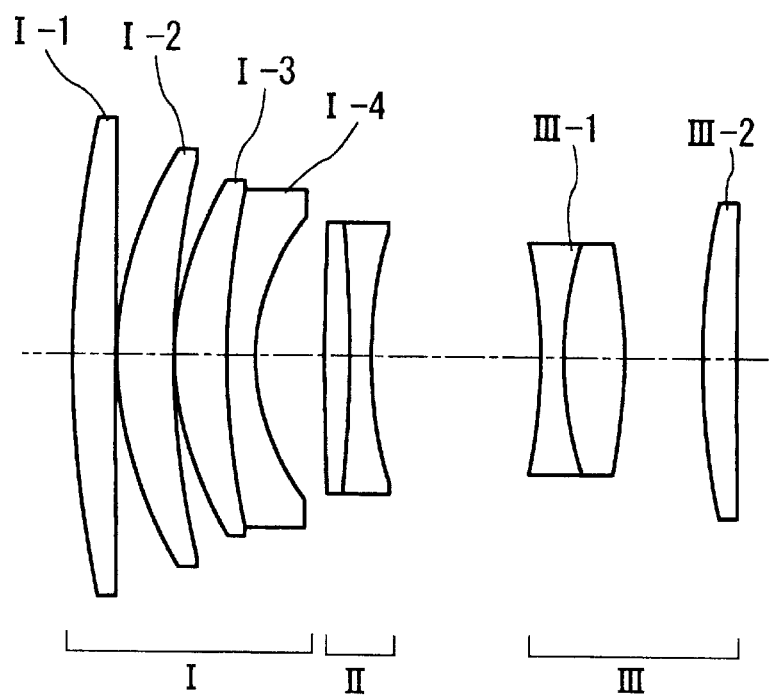
Figure 9:
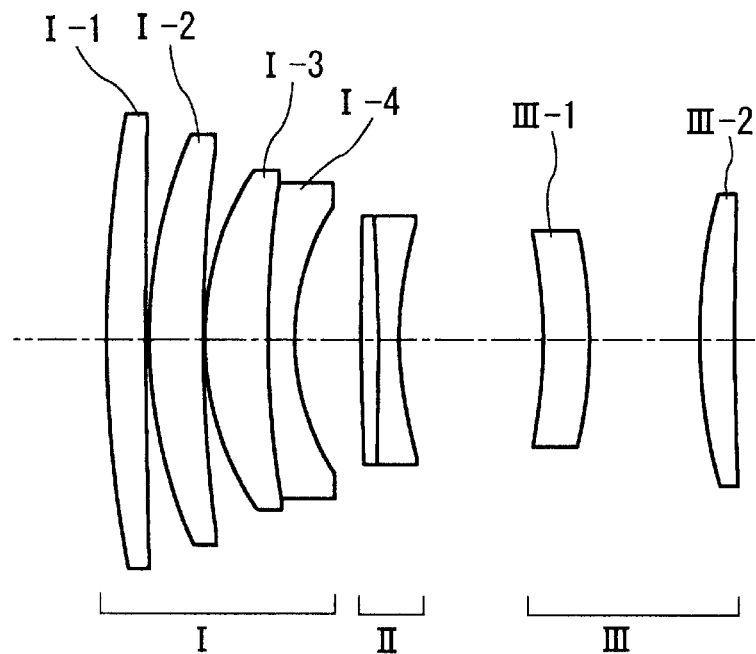
Figure 13:
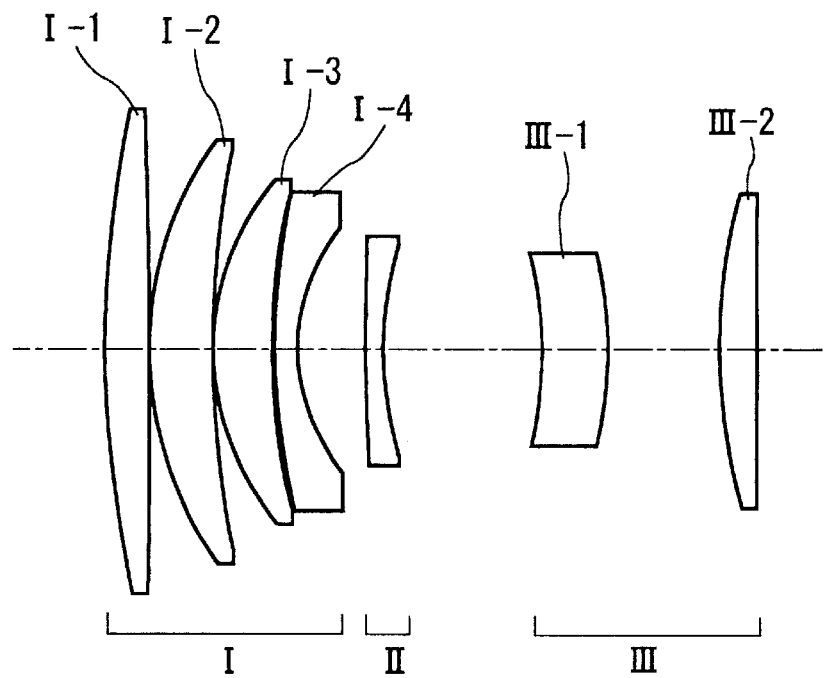
Figure 17:
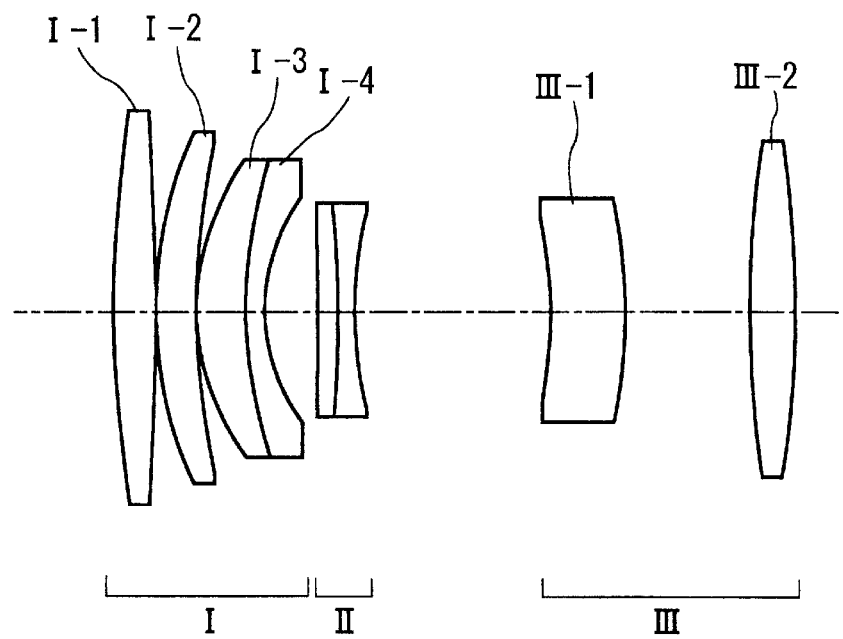
Figure 21:
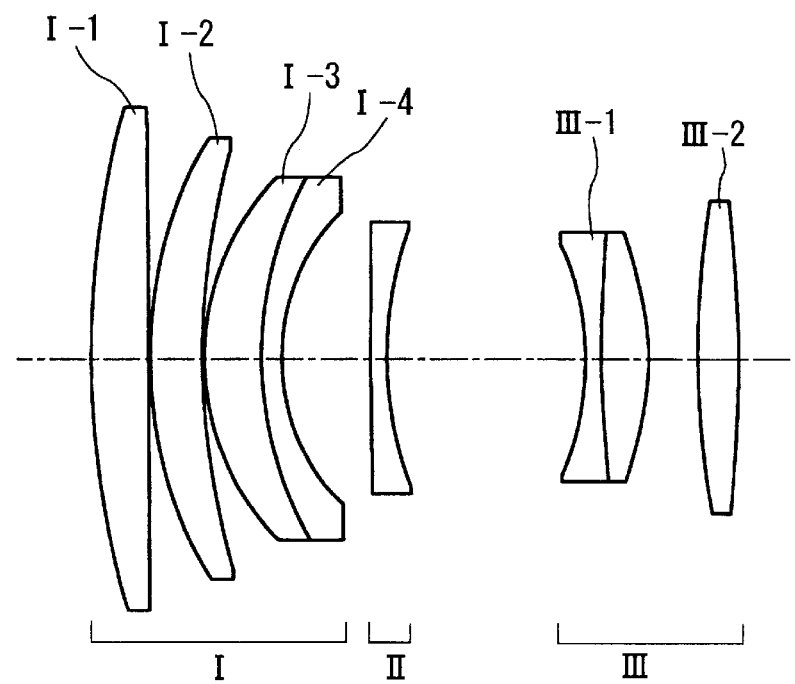

FIG. 1 is a lens diagram of an internal focusing telephoto lens according to a first embodiment, FIGS. 2A, 2B, 2C, 2D and 2E are graphs showing various aberrations, which are spherical aberration, chromatic aberration indicated by spherical aberrations, lateral chromatic aberration, astigmatism and distortion, of the telephoto lens according to the first embodiment in the infinite focusing condition, FIGS. 3A, 3B, 3C, 3D and 3E are graphs showing the various aberrations of the telephoto lens according to the first embodiment when magnification is −0.025×, FIGS. 4A, 4B, 4C, 4D and 4E are graphs showing the various aberrations of the telephoto lens according to the first embodiment when magnification is −0.129×, FIG. 5 is a lens diagram of an internal focusing telephoto lens according to a second embodiment, FIGS. 6A, 6B, 6C, 6D and 6E are graphs showing various aberrations of the telephoto lens according to the second embodiment in the infinite focusing condition, FIGS. 7A, 7B, 7C, 7D and 7E are graphs showing the various aberrations of the telephoto lens according to the second embodiment when magnification is −0.025×, FIGS. 8A, 8B, 8C, 8D and 8E are graphs showing the various aberrations of the telephoto lens according to the second embodiment when magnification is −0.134×, FIG. 9 is a lens diagram of an internal focusing telephoto lens according to a third embodiment, FIGS. 10A, 10B, 10C, 10D and 10E are graphs showing various aberrations of the telephoto lens according to the third embodiment in the infinite focusing condition, FIGS. 11A, 11B, 11C, 11D and 11E are graphs showing the various aberrations of the telephoto lens according to the third embodiment when magnification is −0.025×, FIGS. 12A, 12B, 12C, 12D and 12E are graphs showing the various aberrations of the telephoto lens according to the third embodiment when magnification is −0.133×, FIG. 13 is a lens diagram of an internal focusing telephoto lens according to a fourth embodiment, FIGS. 14A, 14B, 14C, 14D and 14E are graphs showing various aberrations of the telephoto lens according to the fourth embodiment in the infinite focusing condition, FIGS. 15A, 15B, 15C, 15D and 15E are graphs showing the various aberrations of the telephoto lens according to the fourth embodiment when magnification is −0.025×, FIGS. 16A, 16B, 16C, 16D and 16E are graphs showing the various aberrations of the telephoto lens according to the fourth embodiment when magnification is −0.132×, FIG. 17 is a lens diagram of an internal focusing telephoto lens according to a fifth embodiment, FIGS. 18A, 18B, 18C, 18D and 18E are graphs showing various aberrations of the telephoto lens according to the fifth embodiment in the infinite focusing condition, FIGS. 19A, 19B, 19C, 19D and 19E are graphs showing the various aberrations of the telephoto lens according to the fifth embodiment when magnification is −0.025×, FIGS. 20A, 20B, 20C, 20D and 20E are graphs showing the various aberrations of the telephoto lens according to the fifth embodiment when magnification is −0.194×, FIG. 21 is a lens diagram of an internal focusing telephoto lens according to a sixth embodiment, FIGS. 22A, 22B, 22C, 22D and 22E are graphs showing various aberrations of the telephoto lens according to the sixth embodiment in the infinite focusing condition, FIGS. 23A, 23B, 23C, 23D and 23E are graphs showing the various aberrations of the telephoto lens according to the sixth embodiment when magnification is −0.020×, and FIGS. 24A, 24B, 24C, 24D and 24E are graphs showing the various aberrations of the telephoto lens according to the sixth embodiment when magnification is −0.124×.

DESCRIPTION OF THE EMBODIMENTS

Embodiments of the present invention will be described with reference to the drawings. Each internal focusing telephoto lens of the embodiments includes a first lens group I of positive refractive power, a second lens group II of negative refractive power and a third lens group III of positive refractive power, arranged in order from an object side. The second lens group II moves along an optical axis for focusing and the another lens groups do not move for focusing.

The first lens group I includes a first positive lens I-1, a second positive meniscus lens I-2 whose object side surface is convex, a third positive meniscus lens I-3 whose object side surface is convex and a fourth negative meniscus lens I-4 whose object side surface is convex, in order from the object side. This construction of the first lens group I is determined to primarily correct spherical aberration and coma that increase as the f-number becomes small.

Then, at least two of the first positive lens I-1, the second positive meniscus lens I-2 and the third positive meniscus lens I-3 in the first lens group I satisfy the following conditions (1) and (2);

$$1.55 < n_I < 1.75 \quad (1)$$

$$61 < v_I \quad (2)$$

where $n_I$ is refractive index and $v_I$ is Abbe number of the lenses in the first lens group I.

Since the telephoto lens of the present invention has small f-number, spherical aberration, coma, field curvature and astigmatism tend to become large. The condition (1) is required to correct the aberrations. When the refractive index $n_I$ is smaller than 1.55, since radii of curvatures of lens surfaces become small to be obtain predetermined refractive power, spherical aberration and coma become too large to correct sufficiently. On the other hand, when the refractive index $n_I$ is larger than 1.75, there are no materials that have appropriate Abbe number $v_I$ to correct chromatic aberration.

The condition (2) defines the Abbe number of the positive lenses. Since chromatic aberration is proportional to focal length, it is important to correct chromatic aberration in the telephoto lens whose focal length is long. When the Abbe number $v_I$ is smaller than 61, it becomes difficult to correct chromatic aberration.

Further, the third lens group III includes a first meniscus lens III-1 whose object side surface is concave and a second positive lens III-2. The first lens III-1 in the third lens group III consists of a biconcave lens and a biconvex lens that are cemented to each other in the first, second, fifth and sixth embodiments. In the third and fourth embodiment, the first lens III-1 of the third lens group III is a single meniscus lens.

The third lens group III satisfies the following conditions (3) and (4).

$$-10 < f/r_{III\text{-}1\text{-}1} < -1.5 \quad (3)$$

$$0.003 < d_{III\text{-}1\text{-}III\text{-}2}/f < 0.25 \quad (4)$$

where f is focal length of the entire lens system in an infinite focusing condition, $r_{III\text{-}1\text{-}1}$ is a radius of curvature of the object side surface of the first lens III-1 in the third lens group III and $d_{III\text{-}1\text{-}III\text{-}2}$ is a distance between the first lens III-1 and the second lens III-2 in the third lens group III.

The condition (3) defines the curvature of the closest surface to the object in the third lens group III. When the ratio $f/r_{III\text{-}1\text{-}1}$ is smaller than −10, the negative refractive power of the concave surface becomes too strong, which increases high-order spherical aberration and sagittal coma, and also increases difficulty of lens manufacturing. On the other hand, the ratio $f/r_{III\text{-}1\text{-}1}$ is larger than −1.5, the negative refractive power of the concave surface becomes too weak to correct third-order spherical aberration and third-order coma.

The condition (4) defines the distance $d_{III\text{-}1\text{-}III\text{-}2}$ between the first and second lenses of the third lens group III with respect to the focal length f. Since the position of the concave surface of the first lens III-1 is fixed to minimize the spherical aberration and coma as described above, the distance $d_{III\text{-}1\text{-}III\text{-}2}$ substantially defines the distance between the second lens III-2 and an image plane.

The lower limit of the condition (4) is mainly determined to correct field curvature. In general, a positive lens located near an image plane can correct the field curvature, and therefore, it is preferable that the positive second lens III-2 is close to the image plane. That is, the distance $d_{III\text{-}1\text{-}III\text{-}2}$ is preferable to be large to locate the second lens III-2 at the position close to the image plane. When the ratio $d_{III\text{-}1\text{-}III\text{-}2}/f$ is larger than 0.003, the field curvature is well corrected. Alternatively, if the ratio $d_{III\text{-}1\text{-}III\text{-}2}/f$ is smaller than 0.003, the distance $d_{III\text{-}1\text{-}III\text{-}2}$ becomes too short to correct the field curvature.

On the other hand, the upper limit of the condition (4) is determined by mechanical requirements. In a photographing camera or a video camera, a mirror or a filter is often located between the second lens III-2 and the image plane, which requires a predetermined distance between the second lens III-2 and the image plane. Further, the diameter of the second lens III-2 has a negative correlation with the distance between the second lens III-2 and the image plane, which also requires the predetermined distance to maintain the diameter of the second lens within a proper range, particularly when the telephoto lens is an interchangeable lens. When the ratio $d_{III-1-III-2}/f$ is smaller than 0.25, the appropriate distance can be obtain between the second lens III-2 and the image plane to satisfy the mechanical requirements. Alternatively, if the ratio $d_{III-1-III-2}/f$ is larger than 0.25, the distance between the second lens and the image plane becomes too short to satisfy the mechanical requirements.

The negative second lens group II consists of a positive lens and a negative lens that are cemented to each other in the first, second, third and fifth embodiments. In the fourth and sixth embodiments, the second lens group II is a single negative lens. Since the second lens group II moves for focusing, it is preferable that weight of the second lens group II is as light as possible to reduce load for the focusing mechanism. In this context, the single lens is the best solution. On the other hand, the second lens group II is required to have small chromatic aberration in order to avoid variation of the chromatic aberration of the entire system during the focusing. The cemented lens lowers the chromatic aberration as a matter of course, while the single lens can be used when the Abbe number $v_{II}$ of the second lens group satisfies the following condition (5).

$$65 < v_{II} \quad (5)$$

Six embodiments of the internal focusing telephoto lens according to the present invention will be described hereinafter.

First Embodiment

FIG. 1 shows the construction of the internal focusing telephoto lens according to the first embodiment in the infinite focusing condition. The positive first lens group I consists of the first positive meniscus lens I-1 whose object side surface is convex, the second positive meniscus lens I-2 whose object side surface is convex, the third positive meniscus lens I-3 whose object side surface is convex and the fourth negative meniscus lens I-4 whose object side surface is convex, in order from the object side. The third lens I-3 and the fourth lens I-4 are cemented to each other. The negative second lens group II is a cemented lens that consists of a biconvex lens and a biconcave lens. The positive third lens group III consists of the first negative meniscus lens III-1 that is a cemented lens of a biconcave lens and a biconvex lens, and the second biconvex lens III-2, in order from the object side. The second lens group II moves from the object side to the image side when the focusing condition varies from infinity to close.

The numerical construction of the telephoto lens according to the first embodiment is described in TABLE 1. In the table, FNo denotes a f-number, f denotes the focal length, 2W (degrees) denotes a view angle, fB (mm) denotes a back focus, r (mm) denotes a radius of curvature of a surface, d (mm) denotes a distance between the surfaces along the optical axis, n denotes a refractive index at a wavelength of 588 nm(d-line) and v denotes an Abbe number. The surfaces of No. 1 through 7 indicate the first lens group I, the surfaces of No. 8 through 10 indicate the second lens group II and the surfaces of No. 11 through 15 indicate the third lens group III. The distances d7 and d10 vary due to focusing and are shown in a lower part of TABLE 1 with respect to magnification.

TABLE 1

FNO = 1:2.8   f = 148.50   2W = 26.6   fB = 75.54

| Surface No. | r | d | n | v |
|---|---|---|---|---|
| 1 | 112.539 | 6.09 | 1.60311 | 60.7 |
| 2 | 1176.186 | 0.20 | — | — |
| 3 | 51.302 | 6.43 | 1.61800 | 63.4 |
| 4 | 98.325 | 0.20 | — | — |
| 5 | 40.185 | 8.10 | 1.61800 | 63.4 |
| 6 | 115.810 | 3.45 | 1.63980 | 34.5 |
| 7 | 28.271 | d7 | — | — |
| 8 | 436.421 | 3.13 | 1.80518 | 25.4 |
| 9 | −296.144 | 3.00 | 1.65844 | 50.9 |
| 10 | 62.204 | d10 | — | — |
| 11 | −56.679 | 3.00 | 1.57501 | 41.5 |
| 12 | 45.758 | 7.49 | 1.56883 | 56.3 |
| 13 | −62.358 | 10.20 | — | — |
| 14 | 104.769 | 4.58 | 1.72000 | 42.0 |
| 15 | −1878.877 | — | | |

| Magnification | 0.000 | −0.025 | −0.129 |
|---|---|---|---|
| d7 | 9.07 | 11.91 | 24.44 |
| d10 | 23.24 | 20.41 | 7.87 |

FIGS. 2A through 2E show third order aberrations of the telephoto lens according to the first embodiment in the infinite focusing condition, that is, at the magnification of 0.00×. Specifically, FIG. 2A shows spherical aberration SA at d-line (588 nm) and sine condition SC, FIG. 2B shows chromatic aberration indicated by spherical aberrations at d-line, g-line (436 nm) and c-line (656 nm), FIG. 2C shows a lateral chromatic aberration at the same wavelengths as in FIG. 2B, FIG. 2D shows an astigmatism (S: Sagittal, M: Meridional), and FIG. 2E shows distortion.

The vertical axes in FIGS. 2A and 2B represents F-number, and the vertical axes in FIGS. 2C through 2E respectively represent the half view angle W (degrees). Unit of the horizontal axis is "mm" in each of FIGS. 2A through 2D, and is "percent" in FIG. 2E.

The various aberrations vary as the focusing distance changes. FIGS. 3A through 3E show the aberrations in an intermediate focusing distance at the magnification of −0.025×, and FIGS. 4A through 4E show the aberrations in the closest focusing distance at the magnification of −0.129×. In the graphs of the lateral chromatic aberration, the astigmatism and the distortion for the finite focusing distance, the unit of the vertical axis represents an image height Y (mm) that is the distance from the optical axis on the image plane.

Second Embodiment

FIG. 5 shows the construction of the internal focusing telephoto lens according to the second embodiment in the infinite focusing condition. The positive first lens group I consists of the first biconvex lens I-1 whose image side surface is almost flat, the second positive meniscus lens I-2 whose object side surface is convex, the third positive meniscus lens I-3 whose object side surface is convex and the fourth negative meniscus lens I-4 whose object side surface is convex, in order from the object side. The negative second lens group II is a cemented lens that consists of a biconvex lens and a biconcave lens. The positive third lens group III consists of the first positive meniscus lens III-1 that is a cemented lens of a biconcave lens and a biconvex lens, and the second positive meniscus lens III-2 whose object side surface is convex, in order from the object side. The second lens group II moves from the object side to the image side when the focusing condition varies from infinity to close.

The numerical construction of the telephoto lens according to the second embodiment is described in TABLE 2. The surfaces of No. 1 through 8 indicate the first lens group I, the surfaces of No. 9 through 11 indicate the second lens group II and the surfaces of No. 12 through 16 indicate the third lens group III. The distances d8 and d11 vary due to focusing and are shown in a lower part of TABLE 2 with respect to magnification.

TABLE 2

| FNo = 1:2.8 | f = 148.50 | 2W = 26.6 | fB = 74.11 | |
|---|---|---|---|---|
| Surface No. | r | d | n | ν |
| 1 | 134.156 | 5.91 | 1.60311 | 60.7 |
| 2 | −12805.839 | 0.20 | — | — |
| 3 | 47.838 | 7.33 | 1.61800 | 63.4 |
| 4 | 105.735 | 0.20 | — | — |
| 5 | 39.971 | 7.01 | 1.61800 | 63.4 |
| 6 | 96.984 | 0.28 | — | — |
| 7 | 107.696 | 3.45 | 1.64769 | 33.8 |
| 8 | 27.846 | d8 | — | — |
| 9 | 505.010 | 3.19 | 1.80518 | 25.4 |
| 10 | −241.610 | 3.00 | 1.65844 | 50.9 |
| 11 | 60.895 | d11 | — | — |
| 12 | −67.959 | 3.00 | 1.57501 | 41.5 |
| 13 | 43.747 | 8.25 | 1.56883 | 56.3 |
| 14 | −68.712 | 10.41 | — | — |
| 15 | 93.937 | 4.42 | 1.70154 | 41.2 |
| 16 | 929.932 | — | | |
| Magnification | 0.000 | −0.025 | −0.134 | |
| d8 | 9.19 | 11.91 | 24.60 | |
| d11 | 22.28 | 19.56 | 6.87 | |

FIGS. 6A through 6E show the various aberrations of the telephoto lens according to the second embodiment in the infinite focusing condition, that is, at the magnification of 0.00×. FIGS. 7A through 7E show the aberrations in an intermediate focusing distance at the magnification of −0.025×, and FIGS. 8A through 8E show the aberrations in the closest focusing distance at the magnification of −0.134×.

Third Embodiment

FIG. 9 shows the construction of the internal focusing telephoto lens according to the third embodiment in the infinite focusing condition. The positive first lens group I consists of the first positive meniscus lens I-1 whose object side surface is convex, the second positive meniscus lens I-2 whose object side surface is convex, the third positive meniscus lens I-3 whose object side surface is convex and the fourth negative meniscus lens I-4 whose object side surface is convex, in order from the object side. The negative second lens group II is a cemented lens that consists of a biconvex lens and a biconcave lens. The positive third lens group III consists of the first positive meniscus lens III-1 of which object side surface is concave and the second positive meniscus lens III-2 whose object side surface is convex, in order from the object side. The second lens group II moves from the object side to the image side when the focusing condition varies from infinity to close.

The numerical construction of the telephoto lens according to the third embodiment is described in TABLE 3. The surfaces of No. 1 through 8 indicate the first lens group I, the surfaces of No. 9 through 11 indicate the second lens group II and the surfaces of No. 12 through 15 indicate the third lens group III. The distances d8 and d11 vary due to focusing and are shown in a lower part of TABLE 3 with respect to magnification.

TABLE 3

| FNo = 1:2.8 | f = 148.50 | 2W = 26.6 | fB = 67.72 | |
|---|---|---|---|---|
| Surface No. | r | d | n | ν |
| 1 | 162.221 | 5.74 | 1.62041 | 60.3 |
| 2 | 2466.331 | 0.20 | — | — |
| 3 | 61.201 | 8.19 | 1.61800 | 63.4 |
| 4 | 192.485 | 0.20 | — | — |
| 5 | 39.808 | 8.99 | 1.61800 | 63.4 |
| 6 | 137.613 | 0.30 | — | — |
| 7 | 158.446 | 3.45 | 1.64769 | 33.8 |
| 8 | 29.868 | d8 | — | — |
| 9 | 1802.167 | 2.38 | 1.80518 | 25.4 |
| 10 | −459.541 | 3.00 | 1.55149 | 55.3 |
| 11 | 51.492 | d11 | — | — |
| 12 | −73.805 | 7.00 | 1.48749 | 70.3 |
| 13 | −59.292 | 16.08 | — | — |
| 14 | 73.208 | 5.00 | 1.48749 | 70.3 |
| 15 | 603.553 | — | | |
| Magnification | 0.000 | −0.025 | −0.133 | |
| d8 | 9.81 | 12.27 | 23.47 | |
| d11 | 20.81 | 18.35 | 7.15 | |

FIGS. 10A through 10E show the various aberrations of the telephoto lens according to the third embodiment in the infinite focusing condition, that is, at the magnification of 0.00×. FIGS. 11A through 11E show the aberrations in an intermediate focusing distance at the magnification of −0.025×, and FIGS. 12A through 12E show the aberrations in the closest focusing distance at the magnification of −0.133×.

Fourth Embodiment

FIG. 13 shows the construction of the internal focusing telephoto lens according to the fourth embodiment in the infinite focusing condition. The positive first lens group I consists of the first biconvex lens I-1, the second positive meniscus lens I-2 whose object side surface is convex, the third positive meniscus lens I-3 whose object side surface is convex and the fourth negative meniscus lens I-4 whose object side surface is convex, in order from the object side. The negative second lens group II consists of a single lens that is a negative meniscus lens whose object side surface is convex. The positive third lens group III consists of the first positive meniscus lens III-1 of which object side surface is concave and the second positive meniscus lens III-2 whose object side surface is convex, in order from the object side. The second lens group II moves from the object side to the image side when the focusing condition varies from infinity to close.

The numerical construction of the telephoto lens according to the fourth embodiment is described in TABLE 4. The surfaces of No. 1 through 8 indicate the first lens group I, the surfaces of No. 9 and 10 indicate the second lens group II and the surfaces of No. 11 through 14 indicate the third lens group III. The distances d8 and d10 vary due to focusing and are shown in a lower part of TABLE 4 with respect to magnification.

TABLE 4

| FNo = 1:2.8 | f = 148.50 | 2W = 26.6 | fB = 62.00 | |
|---|---|---|---|---|
| Surface No. | r | d | n | ν |
| 1 | 157.404 | 6.76 | 1.48749 | 70.2 |
| 2 | −1048.970 | 0.20 | — | — |

TABLE 4-continued

| | FNo = 1:2.8 | f = 148.50 | 2W = 26.6 | fB = 62.00 |
|---|---|---|---|---|
| 3 | 52.415 | 9.02 | 1.61800 | 63.4 |
| 4 | 148.669 | 0.20 | — | — |
| 5 | 37.580 | 8.39 | 1.61800 | 63.4 |
| 6 | 91.419 | 0.37 | — | — |
| 7 | 103.346 | 3.45 | 1.64769 | 33.8 |
| 8 | 26.573 | d8 | — | — |
| 9 | 325.255 | 2.58 | 1.48749 | 70.2 |
| 10 | 52.224 | d10 | — | — |
| 11 | −56.984 | 10.00 | 1.59778 | 61.0 |
| 12 | −58.361 | 16.70 | — | — |
| 13 | 76.873 | 5.63 | 1.48749 | 70.2 |
| 14 | 2882.299 | — | | |

| Magnification | 0.000 | −0.025 | −0.132 |
|---|---|---|---|
| d8 | 9.94 | 12.82 | 26.13 |
| d10 | 23.60 | 20.72 | 7.41 |

FIGS. 14A through 14E show the various aberrations of the telephoto lens according to the fourth embodiment in the infinite focusing condition, that is, at the magnification of 0.00×. FIGS. 15A through 15E show the aberrations in an intermediate focusing distance at the magnification of −0.025×, and FIGS. 16A through 16E show the aberrations in the closest focusing distance at the magnification of −0.132×.

Fifth Embodiment

FIG. 17 shows the construction of the internal focusing telephoto lens according to the fifth embodiment in the infinite focusing condition. The positive first lens group I consists of the first biconvex lens I-1, the second positive meniscus lens I-2 whose object side surface is convex, the third positive meniscus lens I-3 whose object side surface is convex and the fourth negative meniscus lens I-4 whose object side surface is convex, in order from the object side. The third lens I-3 and the fourth lens I-4 are cemented to each other. The negative second lens group II is a cemented lens that consists of a positive meniscus lens whose object surface is concave and a biconcave lens. The positive third lens group III consists of the first negative meniscus lens III-1 that is a cemented lens of a biconcave lens and a biconvex lens, and the second biconvex lens III-2, in order from the object side. The second lens group II moves from the object side to the image side when the focusing condition varies from infinity to close.

The numerical construction of the telephoto lens according to the fifth embodiment is described in TABLE 5. The surfaces of No. 1 through 7 indicate the first lens group I, the surfaces of No. 8 through 10 indicate the second lens group II and the surfaces of No. 11 through 15 indicate the third lens group III. The distances d7 and d10 vary due to focusing and are shown in a lower part of TABLE 5 with respect to magnification.

TABLE 5

| | FNo = 1:2.9 | f = 200.02 | 2W = 25.0 | fB = 94.15 |
|---|---|---|---|---|
| Surface No. | r | d | n | ν |
| 1 | 289.585 | 9.91 | 1.61800 | 63.4 |
| 2 | −615.872 | 0.20 | — | — |
| 3 | 95.402 | 9.28 | 1.61800 | 63.4 |
| 4 | 167.703 | 0.20 | — | — |
| 5 | 55.448 | 11.47 | 1.80400 | 46.6 |
| 6 | 99.240 | 4.50 | 1.69895 | 30.1 |
| 7 | 41.359 | d7 | — | — |
| 8 | −2728.426 | 4.63 | 1.80518 | 25.4 |

TABLE 5-continued

| | FNo = 1:2.9 | f = 200.02 | 2W = 25.0 | fB = 94.15 |
|---|---|---|---|---|
| 9 | −383.573 | 4.00 | 1.48749 | 70.2 |
| 10 | 84.727 | d10 | — | — |
| 11 | −105.821 | 5.00 | 1.71736 | 29.5 |
| 12 | 89.702 | 13.00 | 1.69680 | 55.5 |
| 13 | −128.014 | 30.00 | — | — |
| 14 | 240.430 | 11.00 | 1.80610 | 33.3 |
| 15 | −240.430 | — | | |

| Magnification | 0.000 | −0.025 | −0.194 |
|---|---|---|---|
| d7 | 12.48 | 16.88 | 49.98 |
| d10 | 46.60 | 42.20 | 9.09 |

FIGS. 18A through 18E show the various aberrations of the telephoto lens according to the fifth embodiment in the infinite focusing condition, that is, at the magnification of 0.00×. FIGS. 19A through 19E show the aberrations in an intermediate focusing distance at the magnification of −0.025×, and FIGS. 20A through 20E show the aberrations in the closest focusing distance at the magnification of −0.194×.

Sixth Embodiment

FIG. 21 shows the construction of the internal focusing telephoto lens according to the sixth embodiment in the infinite focusing condition. The positive first lens group I consists of the first biconvex lens I-1, the second positive meniscus lens I-2 whose object side surface is convex, the third positive meniscus lens I-3 whose object side surface is convex and the fourth negative meniscus lens I-4 whose object side surface is convex, in order from the object side. The third lens I-3 and the fourth lens I-4 are cemented to each other. The negative second lens group II consists of a single lens that is a negative meniscus lens whose object side surface is convex. The positive third lens group III consists of the first negative meniscus lens III-1 that is a cemented lens of a biconcave lens and a biconvex lens, and the second biconvex lens III-2, in order from the object side. The second lens group II moves from the object side to the image side when the focusing condition varies from infinity to close.

The numerical construction of the telephoto lens according to the sixth embodiment is described in TABLE 6. The surfaces of No. 1 through 7 indicate the first lens group I, the surfaces of No. 8 and 9 indicate the second lens group II and the surfaces of No. 10 through 14 indicate the third lens group III. The distances d7 and d9 vary due to focusing and are shown in a lower part of TABLE 6 with respect to magnification.

TABLE 6

| | FNo = 1:2.0 | f = 99.99 | 2W = 28.8 | fB = 51.06 |
|---|---|---|---|---|
| Surface No. | r | d | n | ν |
| 1 | 106.350 | 6.71 | 1.61800 | 63.4 |
| 2 | −1667.090 | 0.20 | — | — |
| 3 | 49.369 | 6.02 | 1.61800 | 63.4 |
| 4 | 90.156 | 0.20 | — | — |
| 5 | 29.291 | 6.51 | 1.74400 | 44.8 |
| 6 | 40.491 | 2.32 | 1.80518 | 25.4 |
| 7 | 22.620 | d7 | — | — |
| 8 | 959.428 | 2.02 | 1.48749 | 70.2 |
| 9 | 43.102 | d9 | — | — |
| 10 | −31.835 | 1.92 | 1.71736 | 29.5 |
| 11 | 138.512 | 5.50 | 1.70154 | 41.2 |
| 12 | −36.119 | 5.90 | — | — |
| 13 | 98.102 | 4.75 | 1.78590 | 44.2 |

TABLE 6-continued

| FNo = 1:2.0 | f = 99.99 | 2W = 28.8 | fB = 51.06 |
|---|---|---|---|
| 14 | −141.430 | — | |
| Magnification | 0.000 | −0.020 | −0.124 |
| d7 | 10.31 | 12.47 | 24.54 |
| d9 | 23.01 | 20.85 | 8.78 |

FIGS. 22A through 22E show the various aberrations of the telephoto lens according to the sixth embodiment in the infinite focusing condition, that is, at the magnification of 0.00×. FIGS. 23A through 23E show the aberrations in an intermediate focusing distance at the magnification of −0.020×, and FIGS. 24A through 24E show the aberrations in the closest focusing distance at the magnification of −0.124×.

The following TABLE 7 shows the values of the first to sixth embodiments for conditions (1) to (5).

TABLE 7

| | Embodiments | | | | | |
|---|---|---|---|---|---|---|
| Conditions | 1 | 2 | 3 | 4 | 5 | 6 |
| I-1 | | | | | | |
| (1) $n_I$ | 1.60310 | 1.60310 | 1.62041 | 1.48749 | 1.61800 | 1.61800 |
| (2) $v_I$ | 60.7 | 60.7 | 60.3 | 70.2 | 63.4 | 63.4 |
| I-2 | | | | | | |
| (1) $n_I$ | 1.61800 | 1.61800 | 1.61800 | 1.61800 | 1.61800 | 1.61800 |
| (2) $v_I$ | 63.4 | 63.4 | 63.4 | 63.4 | 63.4 | 63.4 |
| I-3 | | | | | | |
| (1) $n_I$ | 1.61800 | 1.61800 | 1.61800 | 1.61800 | 1.80400 | 1.74400 |
| (2) $v_I$ | 63.4 | 63.4 | 63.4 | 63.4 | 46.6 | 44.8 |
| (3) $f/r_{III-1-1}$ | −2.620 | −2.185 | −2.012 | −2.635 | −1.890 | −3.141 |
| (4) $d_{III-1-III-2}/f$ | 0.0687 | 0.0701 | 0.1083 | 0.1125 | 0.1500 | 0.0590 |
| (5) $v_{II}$ | — | — | — | 70.2 | — | 70.2 |

The second and third lenses I-2 and I-3 satisfy the conditions (1) and (2) in the first through fourth embodiments. The first and second lenses I-1 and I-2 satisfy the conditions (1) and (2) in the fifth and sixth embodiments. Thus two positive lenses in the first lens group satisfy the conditions (1) and (2) in all of the embodiments.

Further, all of the embodiments satisfy the conditions (3) and (4). Further, the fourth and sixth embodiments in which the second lens group II is a single lens satisfy the condition (5).

As described above, the internal focusing telephoto lens according to each of the embodiments can reduce the variation of the chromatic aberration, spherical aberration, astigmatism or the like over the full focusing range where f-number is 2.0 through 2.8 and view angle is about 25 degrees while maintaining a relatively small lens number.

The present disclosure relates to the subject matter contained in Japanese Patent Application No. HEI 11-096828, filed on Apr. 2, 1999, which is expressly incorporated herein by reference in its entirety.

What is claimed is:

1. An internal focusing telephoto lens having a plurality of lens groups arranged in order from an object side, said telephoto lens comprising:

a first lens group I of positive refractive power, said first lens group I comprising a first positive lens I-1, a second positive meniscus lens I-2 whose object side surface is convex, a third positive meniscus lens I-3 whose object side surface is convex and a fourth negative meniscus lens I-4 whose object side surface is convex, in order from said object side;

a second lens group II of negative refractive power, said second lens group II being movable along an optical axis for focusing; and a third lens group III of positive refractive power, said third lens group III comprising a first meniscus lens III-1 whose object side surface is concave and a second positive lens III-2;

wherein at least two positive lenses in said first lens group I satisfy the following conditions (1) and (2);

$$1.55 < n_I < 1.75 \quad (1)$$

$$61 < v_I \quad (2)$$

where $n_I$ is refractive index and $v_I$ is Abbe number of the lenses in the first lens group I.

2. The internal focusing telephoto lens according to claim 1, wherein said first lens III-1 in said third lens group III consists of a biconcave lens and a biconvex lens that are cemented to each other.

3. The internal focusing telephoto lens according to claim 1, further satisfying the following condition (3);

$$-10 < f/r_{III-1-1} < -1.5 \quad (3)$$

where f is focal length of the entire lens system in an infinite focusing condition and $r_{III-1-1}$ is a radius of curvature of the object side surface of said first lens III-1 in said third lens group III.

4. The internal focusing telephoto lens according to claim 1, further satisfying the following condition (4);

$$0.003 < d_{III-1-III-2}/f < 0.25 \quad (4)$$

where f is focal length of the entire lens system in an infinite focusing condition and $d_{III-1-III-2}$ is a distance between said first lens III-1 and said second lens III-2 in said third lens group III.

5. An internal focusing telephoto lens having a plurality of lens groups arranged in order from an object side, said telephoto lens comprising:

a first lens group I of positive refractive power;

a second lens group II of negative refractive power, said second lens group II being movable along an optical axis for focusing, wherein said second lens group II consists of a single lens element; and a third lens group III of positive refractive power.

6. The internal focusing telephoto lens according to claim 5, wherein said first lens group I comprises a first positive lens I-1, a second positive meniscus lens I-2 whose object side surface is convex, a third positive meniscus lens I-3 whose object side surface is convex and a fourth negative meniscus lens I-4 whose object side surface is convex, in order from said object side, and wherein said third lens group III comprises a first meniscus lens III-1 whose object side surface is concave and a second positive lens III-2.

7. The internal focusing telephoto lens according to claim 6, wherein at least two positive lenses in said first lens group I satisfy the following conditions (1) and (2);

$$1.55 < n_I < 1.75 \quad (1)$$

$$61 < v_I \quad (2)$$

where $n_I$ is refractive index and $v_I$ is Abbe number of the lenses in the first lens group I.

8. The internal focusing telephoto lens according to claim 6, further satisfying the following condition (3);

$$-10 < f/r_{III\text{-}1\text{-}1} < -1.5 \qquad (3)$$

where f is focal length of the entire lens system in an infinite focusing condition and $r_{III\text{-}1\text{-}1}$ is a radius of curvature of the object side surface of said first lens III-1 in said third lens group III.

9. The internal focusing telephoto lens according to claim 6, further satisfying the following condition (4);

$$0.003 < d_{III\text{-}1\text{-}III\text{-}2}/f < 0.25 \qquad (4)$$

where f is focal length of the entire lens system in an infinite focusing condition and $d_{III\text{-}1\text{-}III\text{-}2}$ is a distance between said first lens III-1 and said second lens III-2 in said third lens group III.

10. The internal focusing telephoto lens according to claim 5, further satisfying the following condition (5);

$$65 < v_{II} \qquad (5)$$

where $v_{II}$ is Abbe number of said single lens element of said second lens group II.

* * * * *